(12) United States Patent
Miller

(10) Patent No.: US 9,254,459 B2
(45) Date of Patent: Feb. 9, 2016

(54) ROOM AIR PURIFIER WITH PRESSURIZATION RELIEF

(71) Applicant: Gregory R. Miller, Washington, MO (US)

(72) Inventor: Gregory R. Miller, Washington, MO (US)

( * ) Notice: Subject to any disclaimer, the term of this patent is extended or adjusted under 35 U.S.C. 154(b) by 0 days.

(21) Appl. No.: 14/029,650

(22) Filed: Sep. 17, 2013

(65) Prior Publication Data

US 2015/0075373 A1    Mar. 19, 2015

(51) Int. Cl.

| | |
|---|---|
| *B01D 29/62* | (2006.01) |
| *B01D 35/143* | (2006.01) |
| *B01D 35/147* | (2006.01) |
| *B01D 46/00* | (2006.01) |
| *B01D 46/44* | (2006.01) |
| *F24F 3/16* | (2006.01) |
| *F24F 11/02* | (2006.01) |
| *F24F 11/00* | (2006.01) |

(52) U.S. Cl.
CPC ........ *B01D 46/0087* (2013.01); *B01D 46/0032* (2013.01); *B01D 46/0086* (2013.01); *B01D 46/446* (2013.01); *B01D 46/448* (2013.01); *F24F 3/1603* (2013.01); *F24F 11/022* (2013.01); *F24F 2003/1682* (2013.01); *F24F 2011/0042* (2013.01)

(58) Field of Classification Search
CPC ..... B01D 29/62; B01D 35/143; B01D 35/147
USPC ........ 55/312, 432, 465, 428, 429, 431, 467.1, 55/466, DIG. 34; 95/273, 19; 96/414, 416, 96/418, 400, 421
See application file for complete search history.

(56) References Cited

U.S. PATENT DOCUMENTS

| | | | | |
|---|---|---|---|---|
| 3,618,659 | A | * | 11/1971 | Rawal ........................... 165/248 |
| 4,336,748 | A | | 6/1982 | Martin et al. |
| 4,940,475 | A | * | 7/1990 | Yaeger ........................... 96/258 |
| 5,099,836 | A | | 3/1992 | Rowland et al. |

(Continued)

FOREIGN PATENT DOCUMENTS

WO    WO 2006/083323 A2    8/2006

OTHER PUBLICATIONS

Safe Room with IQAir Purifiers with Duct Kits, Website AllergyBuyersClub.com, Oct. 22, 2008, 6 pgs.

(Continued)

*Primary Examiner* — Robert A Hopkins
*Assistant Examiner* — Minh-Chau Pham
(74) *Attorney, Agent, or Firm* — Morgan, Lewis & Bockius LLP

(57) ABSTRACT

Systems and methods are provided for an air purifier with over pressurization relief, including the following components. A room air inlet is configured to fluidly receive air from a room. A supply duct inlet is configured to fluidly receive air from a forced air system. An air filter and or air purification means is configured to filter/purify air. An outlet is configured to expel filtered/treated air into the room. A bypass damper system has at least one air filtering mode position and a bypass mode position. A pressure control mechanism is configured to automatically allow the bypass damper system to move from at least one air filtering mode position to a bypass mode position when the air received from the supply duct inlet exceeds a bypass threshold. The bypass mode position guides air from the supply duct inlet into the room without requiring passage through the filter and the outlet.

39 Claims, 22 Drawing Sheets

(56) References Cited

U.S. PATENT DOCUMENTS

| | | | |
|---|---|---|---|
| 5,564,626 A * | 10/1996 | Kettler et al. | ............... 236/49.3 |
| 5,884,500 A | 3/1999 | Wetzel | |
| 6,221,314 B1 | 4/2001 | Bigelow | |
| 6,500,387 B1 | 12/2002 | Bigelow | |
| 6,783,578 B2 | 8/2004 | Tillman, Jr. | |
| 6,960,241 B1 * | 11/2005 | Slenz | ............................... 95/19 |
| 7,105,037 B2 | 9/2006 | Olander et al. | |
| 7,326,387 B2 | 2/2008 | Arts et al. | |
| 7,332,006 B2 | 2/2008 | Kim et al. | |
| 7,578,734 B2 | 8/2009 | Ahmed et al. | |
| 8,118,236 B2 | 2/2012 | Lestage et al. | |
| 8,568,521 B2 * | 10/2013 | Sakashita et al. | ............... 96/418 |
| 2004/0058637 A1 | 3/2004 | Laiti | |
| 2005/0164625 A1 | 7/2005 | Kim et al. | |
| 2006/0021375 A1 | 2/2006 | Wetzel et al. | |
| 2006/0177356 A1 | 8/2006 | Miller | |
| 2008/0076345 A1 | 3/2008 | Wobben | |
| 2009/0023376 A1 | 1/2009 | Miller | |
| 2010/0044447 A1 | 2/2010 | Miller | |

OTHER PUBLICATIONS

Airehaven, Inc., International Search Report and Written Opinion, PCT/US2014/055912, Nov. 25, 2014, 8 pgs.

* cited by examiner

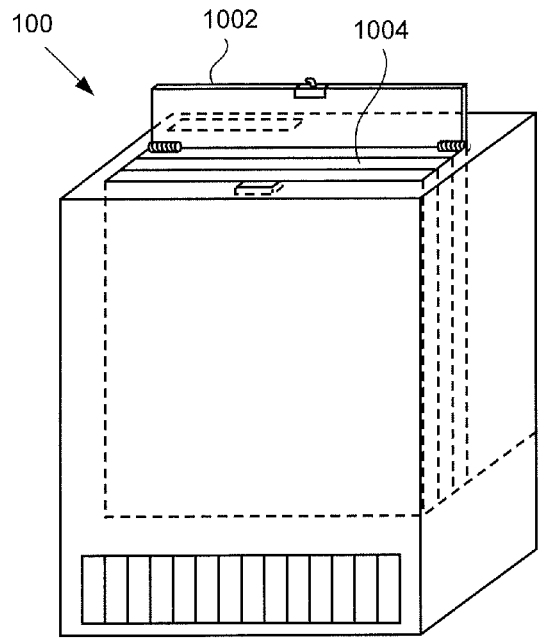
FIG. 10A
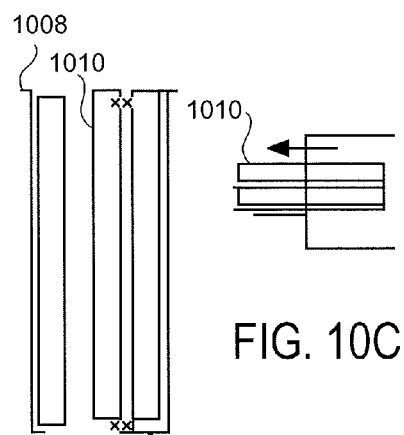
FIG. 10B
FIG. 10C
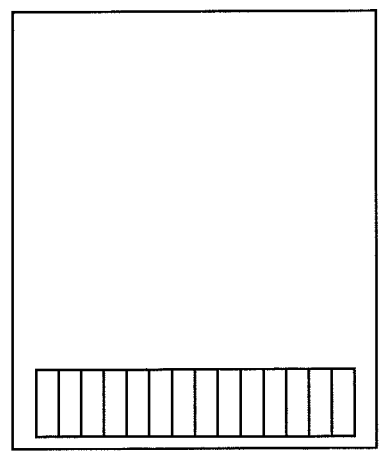
FIG. 10E
FIG. 10D
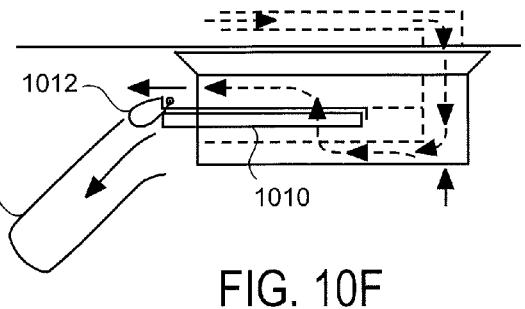
FIG. 10F

ROOM AIR PURIFIER WITH PRESSURIZATION RELIEF

TECHNICAL FIELD

The disclosed embodiments relate generally to purification of air and, more specifically to provide a room air purifier with pressurization relief.

BACKGROUND

Indoor air quality ranks among the top five environmental risks to humans in the United States. The costs are measured in tens of millions of people suffering from allergies and asthma and more formidable airborne VOCs, gases, and other contaminants. The cost to the United States is tens of billions of dollars in health care and lost productivity at work. For instance, the EPA has an exhaustive list of the consequences of poor indoor air quality. As such, it is desirable to provide solutions to indoor air quality.

SUMMARY

Treating air provided from forced air heating and/or cooling systems, which are commonly found in roughly 80% of the homes in the United States (per US Census data) is one way to address improving the above described indoor air quality issues. Furthermore, when dealing with forced air systems it is also desirable to protect the forced air system with pressurization relief capabilities.

The air purification system described in this application is suited to control the source of contaminated air before it enters a room. The air purification system cleans the air before it can enter the room, and re-cleans the cleaned room air. In some embodiments, it also prevents air from outside of the room from entering the cleaned room through a doorway. Furthermore, in some embodiments, the air purification system also serves as a room zone and periodically takes steps to control room temperature. The air purification system also provides a, supply duct over pressure relief capability. Other benefits of some embodiments include user notification/alert and corrective action utilizing the system's internal components. In addition, the air purification system monitors supply duct air temperature and can notify the user of the forced air systems efficiency and performance. In some implementations, room pressure is also monitored to alert the user and to automatically manage its internal systems to insure an appropriate amount of air is returned to the forced air system. Other features allow the air purifier to be turned "off" or unplugged while still installed and means are provided to allow air from a forced air supply duct to flow freely into the room without being drawn through the filter or even coming into contact with the filters. In this manner filter life can be extended and the filter only used when the unit is operating. Additionally, any contaminants on the face of the filter are prevented from mixing with supply air and are prevented from entering into the room in unhealthy concentrations. A forced air system's supply air can continue to heat, cool, or ventilate the room with minimal interference from the non-operating air purifier unit. Communications capabilities of some embodiments allows the air purification system to communicate with other air purification systems and to coordinate controls to alleviate undesirable supply duct pressure and room pressure while continuing to optimize the room temperature in multiple rooms where they are installed. In some embodiments, communication with other simpler systems is also possible. For example, one air purification system with a full complement of accessories can manage and take responsibility for corrective action for other systems with fewer features and capabilities and will, in some embodiments, provide important operating instructions to the other purifier systems.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

One aspect of the disclosure is an air purification system with over pressurization relief capabilities including the following components. A room air inlet is configured to fluidly receive air from a room. A supply duct inlet is configured to fluidly receive air from a forced air system. An air filter/purifier is configured to filter/purify air. An outlet is configured to expel filtered/purified air into the room. A bypass damper system has at least one air filtering mode position and a bypass mode position. A pressure control mechanism is configured to automatically allow the bypass damper system to move from at least one air filtering mode position to a bypass mode position when the air received from the supply duct inlet exceeds a bypass threshold. Furthermore, at least one air filtering mode position guides air from the supply duct inlet and air from the room air inlet to both pass through the filter and the outlet, and impedes air from passing from the supply duct inlet to the room air inlet. Also, the bypass mode position guides air from the supply duct inlet into the room without requiring passage through the filter and the outlet.

Another aspect of the disclosure is a method of providing pressurization relief to an air purification system. An air purification system configured to fluidly receive air from a forced air system, to fluidly receive air from a room, and to expel filtered/purified air into the room is provided. Air pressure from the forced air system is measured. Room air temperature is automatically measured. Unfiltered air from the forced air system is automatically released into the room only when the air received from the forced air system exceeds a bypass threshold. Filtered/purified air from both the room and the forced air system is automatically expelled when the air received from the forced air system does not exceed a bypass threshold and a first temperature condition is met. Furthermore, filtered/purified air from only the forced air system is automatically expelled into the room when the air received from the forced air system does not exceed a bypass threshold and a second temperature condition is met.

Thus, these systems and methods provide new and efficient ways to provide clean, filtered/purified air directly from a forced air system before it reaches the room (with or without a mixing the air from the forced air system with already filtered/purified room air depending on various conditions.) These systems and methods also include new and efficient ways to automatically provide over pressurization relief capabilities to ensure that the forced air system is not harmed by the air purification system.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIGS. 10A-10F illustrate the components of the air purification system that provide convenient filter disposal.

Like reference numerals refer to corresponding parts throughout the drawings.

DESCRIPTION OF EMBODIMENTS

Figure 1:
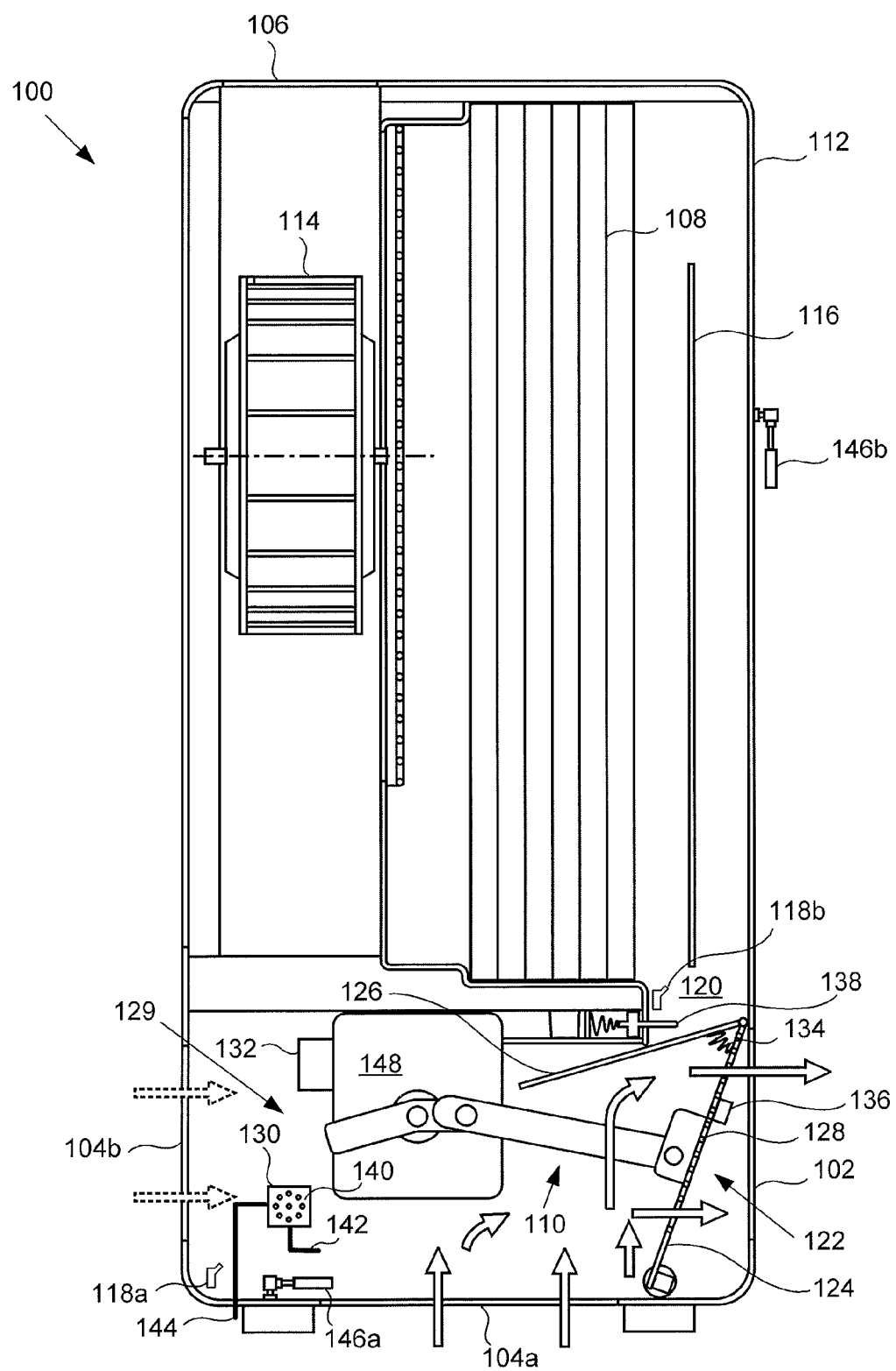
FIG. 1 is a side section view of an air purification system in accordance with one embodiment of the present invention, wherein the bypass damper system is in a bypass mode position.

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present various embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

In some embodiments, when the an air purification system is used with homes equipped with forced air heating and or cooling systems and the associated ductwork or other high velocity piped delivery systems, the room to receive air filtering/purifying treatment may have multiple supply ducts and registers. Air filtering can be accomplished by installing the air purification system on only one supply register. In such instances, others registers are blocked to provide the most efficient/effective room air filtering/purification. The result is, typically, more air will come out of or be drawn out of the remaining open duct than would have been the case if additional ducts were still open. Furthermore, some homes have multiple forced air delivery zones, for example, upstairs and downstairs. The upstairs zone may have fewer rooms served and may also have fewer supply registers. In these cases, the upstairs registers may move more air, per register, since the air handler/blower, in the forced air unit may only operate at one speed in most installations. Blocking the other supply ducts in the one room or even two rooms will have little impact on some forced air systems (e.g. forced air systems are typically sized large enough to handle a higher volume of air through a reduced number of ducts). However, if enough ducts are blocked and air purifier systems are installed on all or many of the remaining open ducts, in some instances the forced air system may become over pressurized. In other words, the pressure at the air purification system could reach a level deemed to have a negative impact on the forced air system. For instance, the pressure may reach an undesirable level of 0.2 inches of water column, for one example, for a particular forced air system installation.

As such, it is advantageous to provide a mechanism and method for providing pressure relief in order to overcome various issues such as those described above. Specifically, it is advantageous to provide an air purification system with over pressurization relief capabilities as described herein.

The air purification system with over pressurization relief capabilities described herein addresses over-pressurization relief for both individual rooms and for an entire home. For instance, an air purification system can be mounted in every room of a user's home without fear of causing over pressurization to the home's forced air system. The air purification system(s) are designed to manage and adapt to the variables found in forced air systems worldwide. As such, new functional requirements are described in the following figures and paragraphs to manage the spectrum of forced air system installations, and the homeowners who operate them. This air purification system also has applications in commercial buildings.

FIG. 1 is a side view of an air purification system with over pressurization relief capabilities 100. In this embodiment the air purification system 100 is configured for sitting on top of a supply register, sealing onto it, and cleaning the air before it enters the room. It should be understood that the air purification system 100 can be connected to any supply register whether on the floor, the wall, or the ceiling without departing from the functions described with respect to this exemplary embodiment. The air purification system 100 includes a room air inlet 102 configured to fluidly receive air from a room, a supply duct inlet 104 configured to fluidly receive air from a forced air system, and an outlet 106 configured to expel filtered/purified air into the room as shown. It is noted that FIG. 1 illustrates a bottom located supply duct inlet 104a for receiving air from a floor vent, but supply duct inlets are located wherever is necessary to receive supply air such as the optional side located supply duct inlet 104b located at the back of the air purification system 100 configured to receive supply air from a wall vent or ceiling vent. In some embodiments, one or more of the supply duct inlets 104 are configured to receive air from a source other than the force air system (e.g., through a wall from another room such as a heated great room). However, the embodiments described in detail below assume a supply inlet 104 receives air from a force air system.

Other components of the air purification system 100 include a housing 112, a bypass damper system 110 in fluid communication with the supply duct inlet 104 and the room air inlet 102, one or more filters (or similar, or other air purification means) 108 configured to filter or purify air, and a fan 114 to draw air into the air purification system 100, through the filters 108 and then expel cleaned air into the room through the outlet 106. It is noted that in some embodiments the fan 114 is an adjustable speed fan having at least a high speed and a low speed.

As will be explained in more detail with respect to FIG. 15, in some embodiments, one or more air distribution panels 116 are included to evenly distribute air over the face of the filters 108 to improve the distribution of air for contaminate collection, to equally slow and balance the flow of air for maximum filtration and absorption, and/or to increase the flow of air by distributing it evenly over the entire area of the filters (or similar air purification means) 108.

FIG. 1 also shows one or more optional ionizers 118. The ionizers 118 release ions which cause positively charged contaminants to clump together and grow in size for improved collection by filters 108. In some embodiments, an ionizer(s) 118a is positioned at or near the supply duct inlet 104. This supply duct ionizer 118a creates an opportunity to concentrate the ionization treatment of the dirtiest air (the air received from the forced air system). In some embodiments, an ionizer 118b is additionally or alternatively positioned in the blend chamber 120. The blend chamber 120 is a space within the air purification system 100 where air received from the supply duct inlet 104 and air received from the room air inlet 102 is allowed to blend together prior to passing through the one or more filters 108. Specifically, in FIG. 1 the blend chamber 120 is located between the supply duct inlet 104, the room air inlet 102, the bypass damper system 110, and the air distribution panels 116. The blend chamber 120 is configured to receive room air and supply duct air independently and simultaneously depending on the positioning of the bypass damper system 110 as will be explained in more detail below. The blend chamber ionizer 118b creates an opportunity for ionization treatment to be evenly applicable to all air prior to entering the filters 108 regardless of the positioning of the bypass damper system 110. In some embodiments, an ionizer 118 is also provided at an air outlet 106 in order provide ionized air to the room, as some consumers appreciate health benefits associated with negatively ionized air. For instance, some users believe that ionized air manages the hormone level in the body which helps in preventing seasonal affective disorder disease which results into depression. Negative air ionizers can also be useful to restore balance to the number of positive ions in a room, often generated by many electrical appliances like televisions and computers.

FIG. 1 illustrates a bypass damper system 110 which includes an air inlet damper 122. The air inlet damper 122 includes a two blade damper mechanism having a first blade 124 and a second blade 126. The first blade 124 defines a plurality of through holes (or slots) 128 configured to allow air to pass there through (as is shown in more detail in FIG. 2C). The second blade 126 is configured to cover and uncover the through holes (or slots) 128 in the first blade 124.

As illustrated in FIGS. 1, 2A, 2B, and 2C the pressurization relief capabilities of the air purification system 100 utilizing a bypass damper system 110 which includes an air inlet damper 122 having a two blade damper mechanism functions as follows. The bypass damper system 110 includes one or more air filtering/purifying mode positions (as illustrated in FIGS. 2 and 3) and a bypass mode position (as illustrated in FIG. 1).

As illustrated in FIG. 1, in the bypass mode position, the first blade 124 is in a first position, covering but not blocking the room air inlet 102 because it's through holes (or slots) 128 are exposed. The second blade 126 is in a second position, which blocks most or all of the air received from the supply duct inlet 104 from entering the blend chamber 120 and subsequent filters 108, and at the same time uncovers the through holes (or slots) 128 in the first blade 124. As such, when the bypass damper system 110 with an air inlet damper 122 is in the bypass mode position (as illustrated in FIG. 1), the air inlet damper 122 guides air from the supply duct inlet 104 into the room without requiring that the air pass through the filter(s) 108 and outlet 106. As such, the air from the forced air system 100 can safely pass from the supply duct inlet 104 pass into the room through the room air inlet 102. In some embodiments, a spring 134 holds the second blade 126 in the bypass mode position. In some embodiments, the second blade is positioned to block and seal out supply duct air from reaching the filters 108, while simultaneously opening a channel for supply duct air to exit the unit through the room air inlet. One advantage of blocking the supply duct air, from reaching the filters 108 is that the air thus will not contact contaminants on the face of the filter and risk placing these contaminants into the room. Another advantage is the filters 108 are not used, prolonging their life, when the air purification system is not running. As such, the placement of the first blade 124 and the second blade 126 of the air inlet damper 122 in the bypass mode position provides both over pressurization relief and contamination safety. In some embodiments, a check damper is also provided to further ensure that the air release through the room air inlet has not contacted contaminants on the face of the filter (e.g., a check damper 303 is illustrated in FIG. 3.)

Thus, this bypass mode position—the combined positioning of the first blade 124 in the first position and the second blade 126 in the second position—is configured to relieve supply duct pressure. It is noted that the bypass mode position is also utilized in situations when the supply duct pressure need not be relieved. For instance, in some embodiments the bypass mode position is the default "off" position for the air purification system 100. In some embodiments, the air purification system 100 is configured to automatically move to the bypass mode position when the air purification system 100 is turned off, unplugged, or malfunctions. As such the air from the forced air system can safely and easily pass from the supply duct inlet 104 out into the room through the holes (or slots) 128 in the first blade 124 covering the room air inlet 102. One advantage of allowing air to pass into the room through the holes 128 in first blade 124 while it covers the room air inlet 102 rather than completely uncovering the room air inlet 102 is that the first blade 124 protects the air purification system 100 from being exposed. For instance the first blade 124 keeps pets and children from touching the interior mechanism of the air purification system 100 and potentially breaking the mechanisms or injuring themselves, without additional protective grills. This protective position is thus especially useful to be the default and off position for the air purification system 100.

Figure 12:
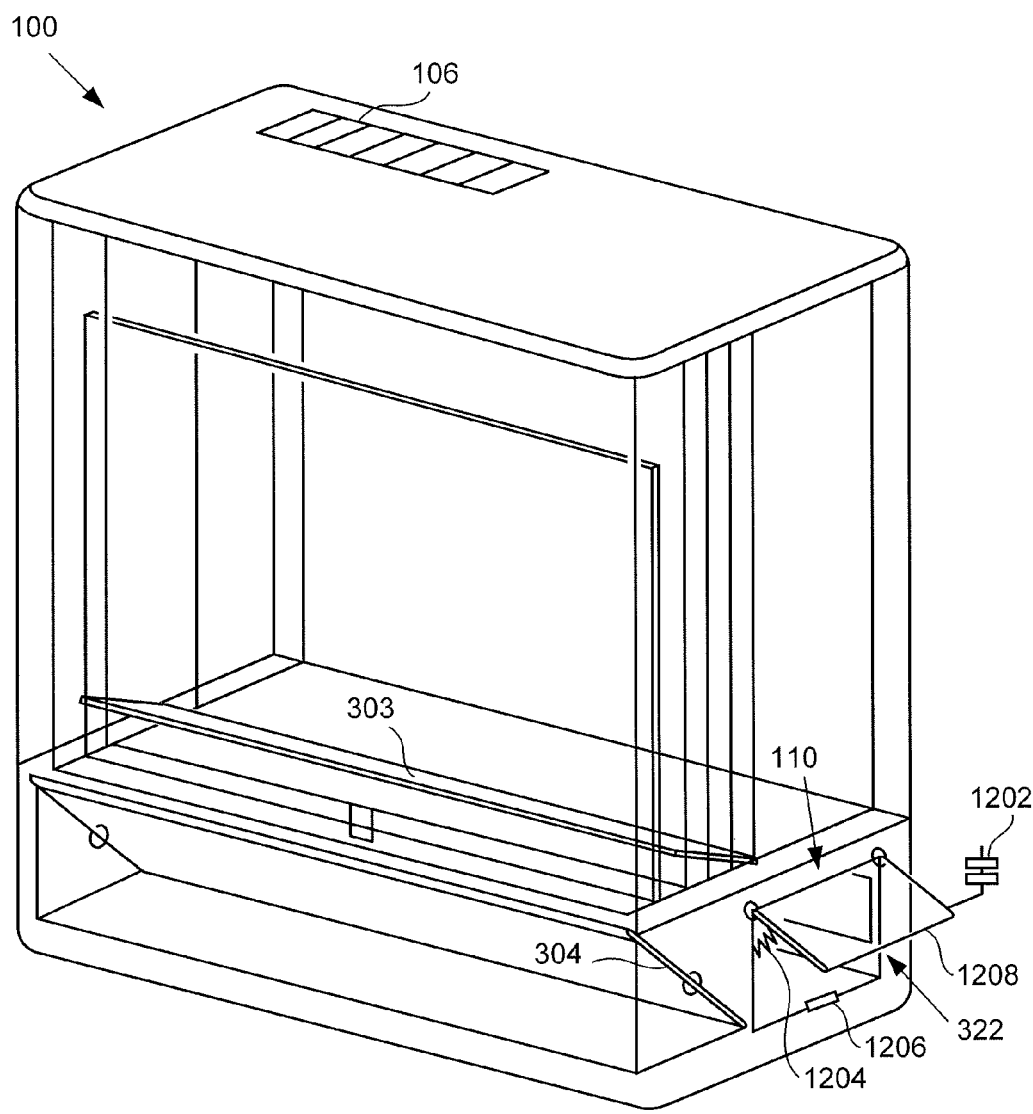
FIG. 12 is a perspective view of an air purification system in accordance with still another embodiment.

The air purification system 100 also includes a pressure control mechanism 129. In some embodiments, as shown in FIG. 1, the pressure control mechanism 129 includes a pressure sensor 130, which is configured to measure the pressure of the air received from the supply duct inlet 104, and an activation means such as an electronic controller 132. The pressure control mechanism 129 is configured to automatically allow the bypass damper system 110 to move from an air filtering/purifying position to a bypass mode position when air received from the supply duct inlet exceeds a bypass threshold. In some embodiments, the bypass damper system 110 is specifically controlled by a motor 148, which controls the first blade 124 that moves from the first position (covering the room air inlet 102) to the third position (uncovering the room air inlet) and various positions in-between. Furthermore, in some embodiments, movement of the second blade 126 from the second position (covering the holes 128 in first blade 124) and the fourth position (uncovering the holes 128 in the first blade 124) is controlled by the electronic controller 132 in conjunction with an electromagnet 136 and spring 134 as explained below. In some other embodiments, as shown in FIG. 12, pressure control is being accomplished through weighted gravity by pass dampers. In other embodiments, the pressure control mechanism 129 is configured to have the electronic controller 132 automatically allow the bypass damper system 110 to move from an air filtering/purifying mode position to a bypass mode position when the measurement of the pressure sensor 130 exceeds a bypass pressure threshold. In some embodiments, a supply duct pressure is automatically initially read during/after installation of the unit. Then a threshold value is added to the initial reading, and this is automatically becomes the bypass threshold. In some embodiments, the bypass pressure threshold depends on the forced air system and the air handler including the size and length of the ducts and register. In some embodiments, the bypass pressure threshold is determined by utilizing a "fixed set point" sensor, a technician setting the bypass threshold, or a combination of both. In some embodiments, more than one bypass threshold is set. For instance, there may be an "open door" bypass pressure threshold and a "closed door" bypass pressure threshold (when the room is closed/sealed from adjoining rooms). Furthermore there may be a "new" filter bypass pressure threshold distinct from a "used" filter bypass threshold, which may be a sliding amount re-adjusted on a periodic based (e.g., weekly, monthly, bi-yearly, or yearly). In the settable option, a HVAC technician assesses the system and sets a high limit. In some instances adequate instructions are provided so that consumers can perform the HVAC technician actions and set a bypass threshold themselves. A consumer or technician may read the digital pressure reading with only one unit operating in 1 room and place the set point above that point. For instance, it is useful to know the forced air systems normal duct pressure when setting the set point.

In some preferred embodiments, the air purification system automatically reads (and optionally records) the supply duct pressure utilizing the pressure sensor 130 and adds a predetermined value to it (plus 0.05 to 0.1 inches of water column, for example). In some embodiments, this is considered the home's normal operating range. In this instance, a maximum bypass pressure threshold is established without human input. It is noted that the measurement taken by the pressure sensor 130 with a new furnace filter in place can also be recorded and used as a maximum set point for a decreased supply duct pressure.

Furthermore, when additional purifier units are added to other rooms, they can adopt the same bypass pressure threshold (plus 0.05 to 0.1 inches of water column, for example). As such, the additional air purification units need not be equipped with mechanisms for automatically measuring supply duct pressure and independently setting an operating range. In some embodiments the original (more advanced) air purification unit is also equipped with mechanisms to control the additional (less advanced) air purification units to take relief actions described in this application. Furthermore, in some embodiments, the more advanced air purification unit provides on its display screen suggestions for customer action regarding the other unit(s) such as suggesting opening a room door, replacing a filter, or even opening supply registers in other (e.g., unused) rooms to restore peak air flow and efficiency to the forced air system. As such, the consumer can save money on utilities. Furthermore, low forced air system air flow, can provide the user with a warning of forced air system failures yet to be fully recognized.

In some embodiments, the electronic controller 132 is configured to relieve supply duct pressure by first increasing the speed of the fan 114 prior to activating the bypass damper system to move from an air filtering mode position to a bypass mode position. For instance, the electronic controller 132 is configured to activate the fan at a high speed, while maintaining the bypass damper system 110 in the at least one air filtering/purifying mode position (e.g. FIG. 2A or FIG. 2B) when the air received from the supply duct inlet 104 exceeds a minimum threshold. It is noted that this minimum threshold is lower than the bypass threshold required by the electronic controller to activate the bypass damper system to move from an air filtering/purifying mode position to a bypass mode position. For instance, in some embodiments the minimum threshold is half of the bypass threshold.

An automatic disengagement of the first blade 124 and the second blade 126 takes place as follows. When supply duct air pressure exceeds a threshold (e.g., as measured by the pressure sensor 130) or if the unit is turned "off", is unplugged, or malfunctions the electromagnet 136 will be caused to lose power and the second blade 126 will be released and the first blade 124 will return to the first position covering the room air inlet 102. As such, air from the supply duct inlet 104 can exit directly into the room as illustrated in FIG. 1. In other words, if the unit is off for any reason the first blade 124 and the second blade 126 will assume the "safety position" illustrated in FIG. 1. It is noted that the supply duct air is prevented from mixing with contaminants on the face of the filters 108 because of the blocking position of the second blade 126

Automatic re-set joining (magnetically latching) of the first blade 124 and the second blade 126 is completed as follows. In some embodiments, the joining is performed each time the air purification system 100 starts or restarts. The first blade 124 moves to the third position and tab 138 pushes the second blade 126 into position to align and seal against the first blade and engaged/held in place by the electromagnet 136. In some other embodiments, the dampers are re-joined manually.

In some embodiments, the pressure sensor 130, located in the supply duct air entry area automatically measures pressure which is reflective of supply duct pressure and overpressure. In other embodiments the pressure sensor 130 also includes a solenoid valve 140 that enables the pressure sensor 130 to collect pressure data from either the supply duct air 142 or from the ambient room environment 144. In some embodiments, the pressure sensor is an MPL 9371 model or 9391 model, which is appropriate for this dual purposing. A custom MPL 3115A2 may also be adapted for the low pressure sensing and data collection. In some embodiments, more than one pressure sensor is used instead of the dual purpose sensor. In some embodiments, the pressure sensor 130 has a digital display/output of pressure values which can be configured to be multiple set points for pressure thresholds stored and to be acted as described herein. In some embodiments, the Solenoid Valve 140 is a 3 way or 4 way center closed configuration for simplicity such as a model SCO726G by ONBO Electronic Co. LTD. A solenoid valve 140 is useful for sampling supply duct air pressure 142 and ambient air pressure 144 alternately, and continuously and most specifically once a high pressure limit is exceeded to monitor corrective action.

For instance, the air purification system 100 can be used to create a positive pressure in a room and therefore positive ventilation of the room to keep the room completely full of clean and filtered air, within a maximum room pressure threshold. In some embodiments, this room pressure threshold can be determined during the room air purifier installation with the customer following prompts to open and close the room door(s) while the air purification system unit runs combinations of fan flow rates and damper positions, logs and interprets the data to establish the maximum room pressure threshold value. Other prompts may include removing the forced air systems filter and providing time for the purifier system to run an installation program, collect a range of data for interpretation and future action. In some embodiments, other prompts will ask that a new filter be installed so the same installation program data can be collected for comparison to the no filter data. It is further noted that in some embodiments flow measurements are adjusted to account for the air density effects caused by temperature and altitude. For instance, the initial pressure data collected is normalized to a range of standard temperatures in the supply duct.

In some implementations a prompt for a used, ready to be discarded, filter is requested to be temporarily installed or re installed so comparative data can be collected to help establish filter condition and future filter change notifications/alerts.

Even without prompts, some embodiments of the air purification system will automatically log data over time. This data includes any of the following or a combination thereof: supply duct air pressure and temperature, ambient room temperature data versus room temperature set point, fan speeds, damper positions and fan speeds, and ambient room air pressure. The data is logged and interpreted over time to pinpoint room door open and door closed events and when they occur. Thus the room air purification system can run performance sequences of fan speed and damper positions and thereby automatically establish a maximum room pressure threshold without consumer assistance. A room profile is thereby created by the air purification system. In some embodiments, ambient room temperature data versus room temperature set point data is used to automatically increase fan speeds to achieve a room temperature customer set point during the forced air systems "on" cycle and or the damper position can be changed to allow more supply duct air to be mixed with room air when the forced air system is "off". An increased percentage of supply duct air versus room air can help the room achieve the homes ambient temperature when the forced air system is not operating. Fan speeds and damper positions can be changed, more or less, throughout the day to minimize fan noise, minimize filter usage and still meet consumer room air temperature set points.

In other embodiments, the ratio of supply duct air versus room air drawn into the air purification system is automatically adjusted to minimize the supply duct air percentage when both supply duct and room air are simultaneously drawn into and through the air purification system. By reducing supply duct air within the operational limits of the supply duct pressure thresholds and while also maintaining a minimum flow requirement from the supply duct to maintain positive room pressure for room ventilation, the filtering of the dirtiest air, coming typically from the supply duct, can be minimized to extend filter life. Additionally, when the air purification system temperature set point is set by the consumer to provide room air temperatures greater than or less than the ambient home temperature, it is advantageous that the air purifier system is capable of adjusting the damper position to use the smallest amount of supply duct air versus room air when both are drawn simultaneously to minimize temperature swings within the room during the forced air systems "off" cycle.

Furthermore, in some embodiments the supply duct pressure data collection when no filter is installed is compared to the data collected when a new filter is installed. Additionally, zip code information about regional utility rates are used to alert and report utility costs associated with the inherent air flow restriction many forced air system filters create. In some embodiments, costs associated with a dirty filter versus a clean filter are also presented to the consumer. As such the air purification system can "pay for itself" by saving energy and suggesting energy saving actions. The system's prompts also elevate energy conservation awareness and actions. Even without the having the user follow a series of installation prompts to determine the room pressure threshold, the purifier system can log supply duct pressure data and extrapolate to recognize filter type changes as well as dirty filter replacements and prompt questions of the user to confirm changes and potentially cause the user to rethink some filter choices.

In these embodiments, when the ambient air pressure 144, exceeds the maximum room pressure threshold, a visual or audio alert is provided to the consumer suggesting to open a door to the room. Opening a room door improves air circulation within the house. Opening a door can also provide room pressure relief. The room door being shut may not allow enough air to exit the room causing excessive ambient air pressure. Furthermore, the air may not be available to externally located intake vents for circulation and re-entry/return into the forced air system. Other ways to reduce room air ambient air pressure 144 include reducing the speed of the fan 114 or moving the bypass damper system to an air filtering mode which draws in less air from the supply duct inlet 104 and more from the room air inlet 102, such as the position illustrated in FIG. 2A. In either instance (or a combination of both) the amount of supply duct air entering into the room is reduced thereby reducing the room air pressure. It is noted that enough open registers in other rooms will sometimes simply supply more air; under these circumstances reducing the possibility the forced air system is likely to experience a restricted return air flow.

When the pressure sensor measures supply duct air pressure 142, it can take a variety of actions depending on the pressure threshold(s) reached. For instance, when a first pressure is exceeded, a lamp may turn on to alert the user. In some embodiments, the bypass damper system will move to the air filtering mode illustrated in FIG. 2B, wherein only air from the supply duct inlet 104 is received. In some instances this will allow for sufficient pressure relief (i.e., the first pressure threshold will no longer be exceeded.) In other embodiments additional action will be taken. For instance if a second pressure threshold is reached or if the first pressure is not relieved during after a period of time, e.g. 1 minute or 5 minutes for example, the speed of the fan 114 may be increased to relieve the excess supply duct pressure. It is noted that an increased fan 114 speed is used to relieve supply duct over-pressurization when the bypass damper system is in any of its air filtering positions, although the position shown in FIG. 2B is the most effective. In some embodiments, the lamp is left on or is set in a flashing mode when the fan speed increases to notify the user that a pressure fix is in progress. Then in the event that an increased fan 114 speed also does not relieve the supply duct pressure or a third threshold is reached, the pressure control mechanism 129 will activate the bypass damper system 110 to move from an air filtering mode position to a bypass mode position allowing the supply duct air to pass directly into the room without requiring (or sometimes by actively disallowing) the air to pass through the filter(s) 108.

In some embodiments, an electronic controller 132, such as a microprocessor based printed circuit board control is utilized to control the fan 114 speed in accordance with the pressure readings as described in the above paragraphs. For instance, in some embodiments, the electronic controller 132 is configured to automatically activate movement of the bypass damper system 110 from the at least one air filtering mode position to the bypass mode position when the measurement of the pressure sensor 142 air exceeds a bypass threshold.

In some embodiments, the controller 132 additionally or alternatively automatically monitors supply duct temperature with a temperature sensor 146a at or near the supply duct inlet 104 area, measures ambient room temperature with another temperature sensor located outside the unit 146b (or isolated inside the unit to only measure ambient air temperature), and controls the speed of the fan 114 or the placement of the bypass damper system in accordance with the temperature readings. The two temperature sensors 146 supply temperature data that is interpreted by the controller 132. In some embodiments, the controller manages room temperature by adjusting the speed of the fan 114. For instance, when the room air temperature sensor 146b measures room air temperature to be above or below a target temperature for the room (as set by the user or determined automatically by the air purification system 100) the speed of the fan 114 is increased to pull more temperature treated air from the forced air system. Then in the event that an increased fan 114 speed also does not allow the room to be within a predetermined range of the target temperature after a period of time (e.g. 30 seconds, 5 minutes, 10 minutes, or 20 minutes), the electronic controller 132 will activate the bypass damper system 110 to move from a first air filtering mode position (FIG. 2A) to a second air filtering mode (FIG. 2B). In some embodiments, when the temperature sensor 146b measures room air temperature and a first temperature condition is met the bypass damper system is configured to be in a first air filtering mode position (FIG. 2A), and when a second temperature condition is met the bypass damper system is configured to be in the second air filtering mode position (FIG. 2B). When supply duct air is of sufficient temperature to add warmth or cool air to the room to achieve a target room temperature, the fan 114 speed and bypass damper system position is adjusted accordingly by a microprocessor program in the electronic control 132. In some embodiments, the electronic controller 132 also activates user alerts and takes actions to provide safety and efficiency during the units operation and/or while it is installed.

In some embodiments, the temperature sensors 146 offer insight into the function of the forced air system derived from the temperature sensors ability to automatically measure supply duct air temperature by the first temperature sensor 146a over time and log data including the coolest supply duct temperatures reached relative to the ambient room air temperature measured by the second temperature sensor 146b in the cooling season and also the warmest supply duct temperatures versus the ambient room air temperature in the warm air required seasons. If the difference between the room air temperature and the supply duct temperature is not as great as recommended, then the central forced air system may need service. The air purification system 100 can automatically recognize the circumstances and report via alert or text message to the user, the need for service by means of the electronic controller 132, which may display information on a display panel of the air purification system 100 or by wirelessly communicating information to a remote device such as a remote control, a personal digital assistant, a tablet computer, or desktop computer (e.g., in some embodiments, the alert is in the form of an email reminder). For instance, a heat pump often requires additional refrigerant after a few years of service. The user may not know this or forget to add the refrigerant. When the heat pump does not get serviced, electricity is unnecessarily wasted and possibly the forced air system components have been or may become damaged. Thus, the benefits of data automatically collected from the temperature sensors 146 extend beyond the air purification system itself. The data automatically collected from the temperature sensors 146 can thus be used to provide information relevant to the forced air system's overall refrigerant charge and or heating capability which, when addressed can result in energy savings for the user. Additionally, a forced air technician may choose the temperature differentials to be monitored during installation of the air purification system 100. In this manner, older equipment can be tuned up and a field evaluation of the optimum performance versus service call criteria can be considered and set points can be adjusted accordingly by the user or the technician. In addition, the air purifier may automatically follow certain generalized forced air system guidelines and performance expectations and report abnormalities for customer consideration.

Figure 2A:
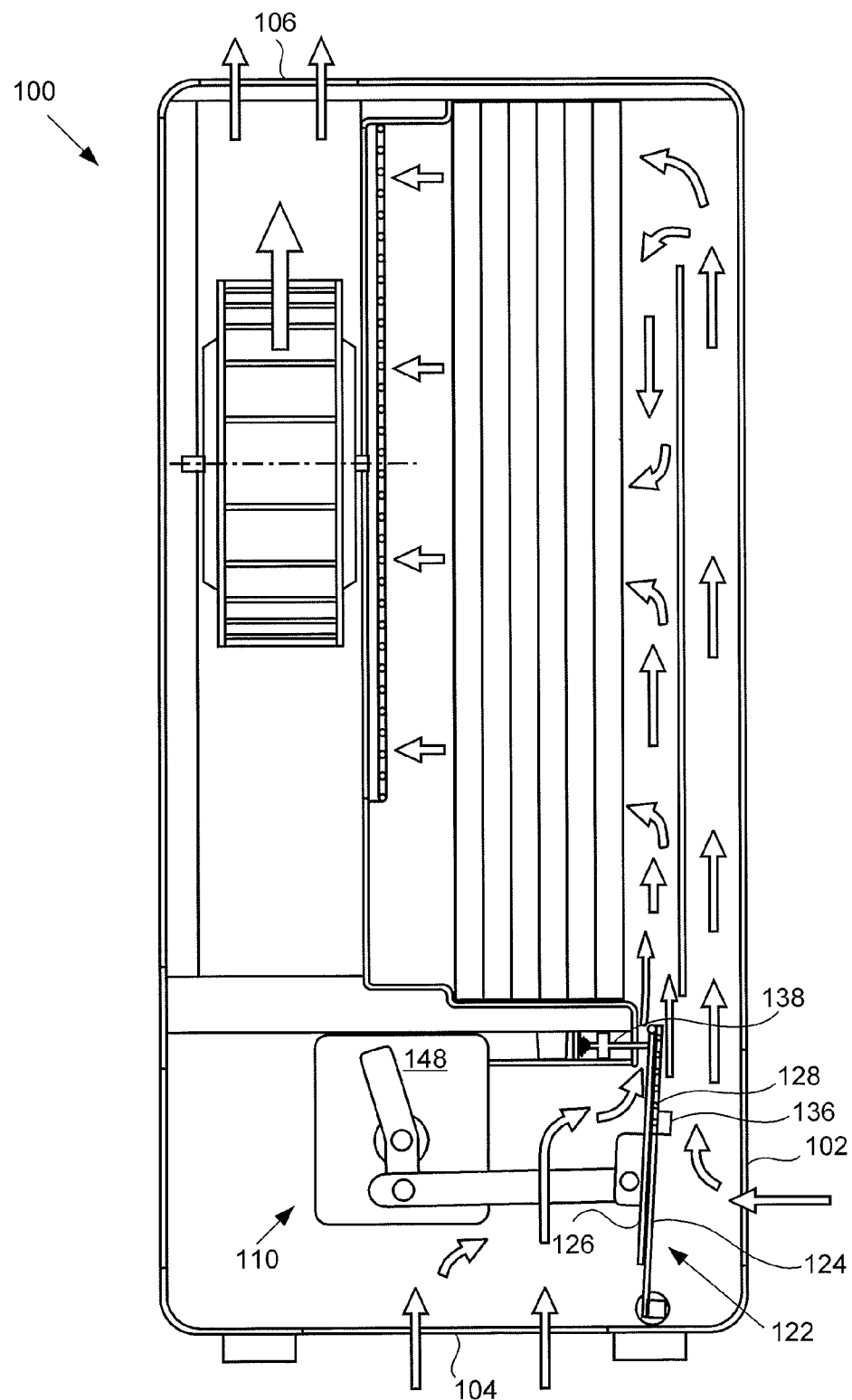
FIGS. 2A and 2B are side section views of the embodiment of FIG. 1, wherein the bypass damper system is in two distinct air filtering/purifying mode positions.
Figure 2B:
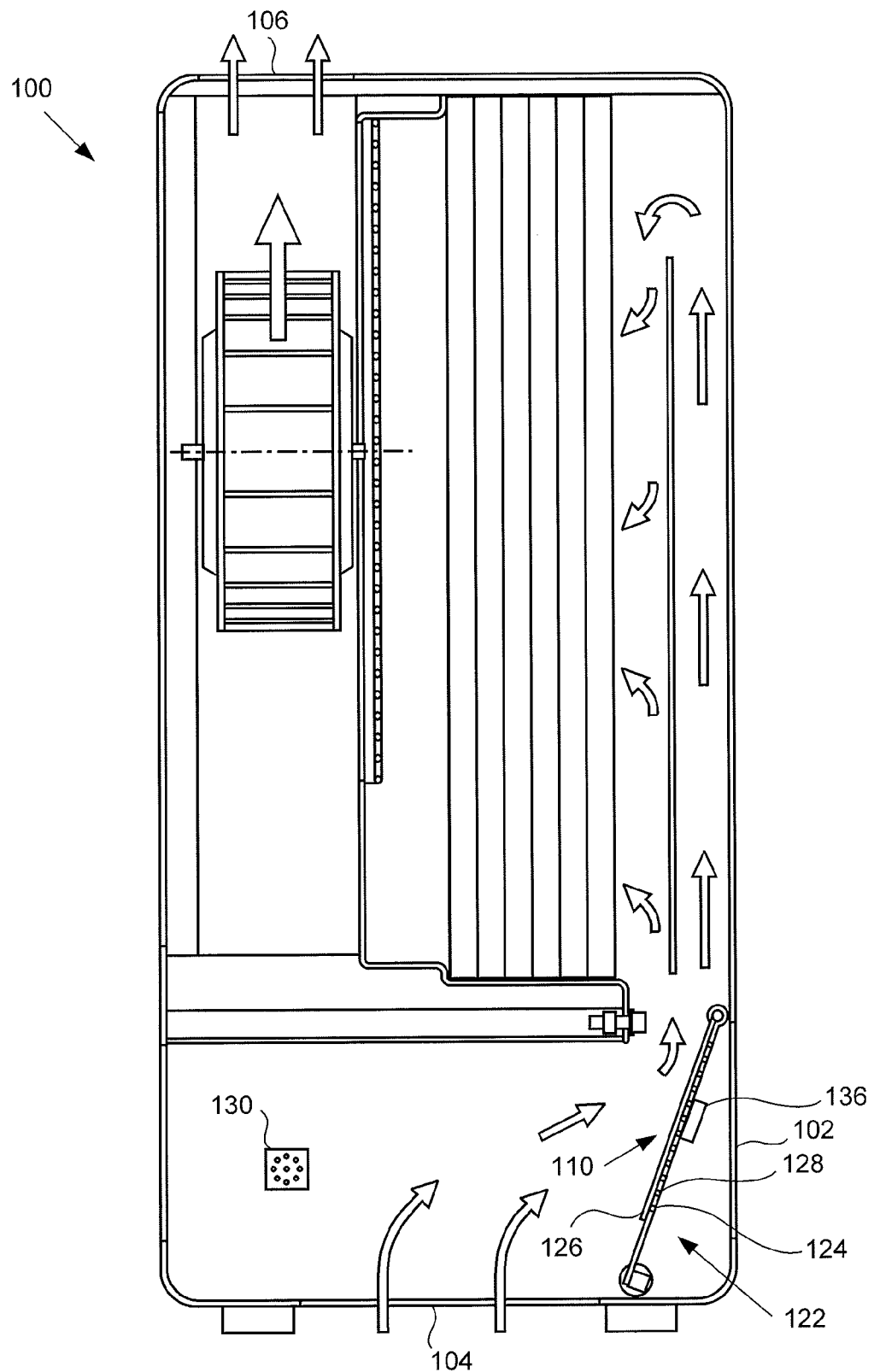
Figure 3:
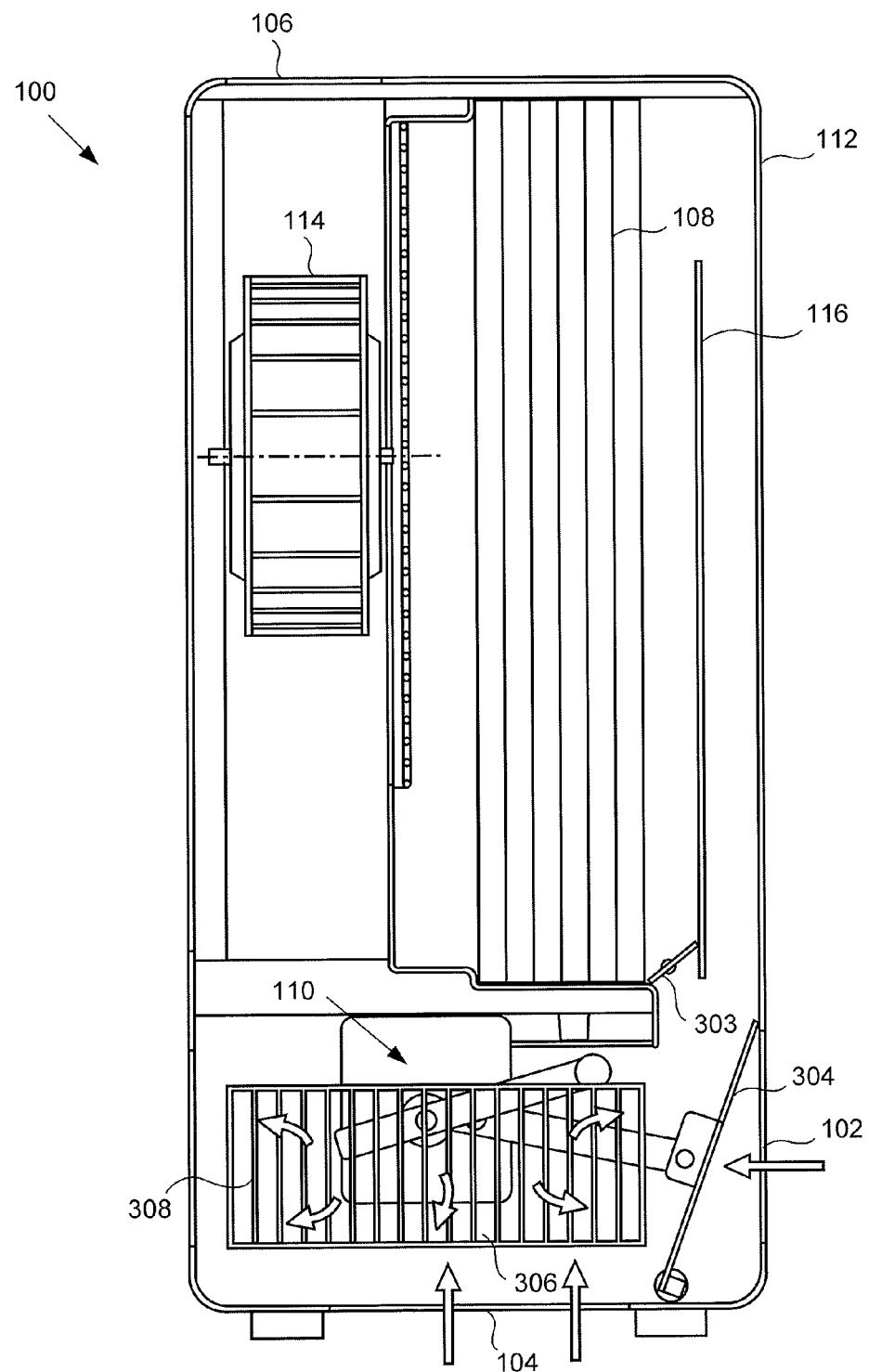
FIG. 3 is a side section view of an air purification system in accordance with another embodiment of the present invention, wherein the bypass damper system is in a bypass mode position.

FIG. 2A is a side section view of the embodiment of FIG. 1, wherein the bypass damper system is in a first air filtering mode position. As illustrated in FIG. 2A, in the first air filtering position the first blade 124 is in a third position, which uncovers the room air inlet 102 allowing air to pass from the room air inlet 102 into the air purification system 100. The second blade 126 is in a fourth position, which seals against the first blade 124 covering the through holes (or slots) 128 in the first blade 124. In some embodiments, the second blade 126 is configured to fit within the exterior boundaries of the first blade 124. In some implementations the second blade 126 seals against the first blade 124 such that the two act as one damper. As illustrated in FIG. 2A, in a first air filtering mode, air inlet damper 122 acts as one damper and is positioned to allow supply duct air and room air to enter the air purification system 100 simultaneously. Specifically, this air filtering position of the air inlet damper 122 guides air from the supply duct inlet 104 and air from the room air inlet 102 to both pass through the filter 108 and the outlet, 106 and simultaneously impedes air from passing from the supply duct inlet 104 to the room air inlet 102. The impeding is done by the second blade 126 covering and thus not allowing air to pass through the holes 128 in the first blade 124. It is beneficial that the air passing from the supply duct inlet 104 is impeded from exiting out of the room air inlet 102 because, during an air filtering mode the dirty air from the forced air system is cleaned most effectively by being guided to be drawn into and pass through the filter 108 before it ever enters the room.

In some embodiments, the second blade 126 is held in place, sealed against the first blade 124 by means of an electro magnet 136. The electro magnet 136 is of sufficient force to hold the second blade 126 against the first blade 124 and to compress the spring 134. In some embodiments, tab 138 is placed in a position to force the second blade 126 into contact with the first blade 124 and the electro magnet 136 when the first blade 124 moves to the third position, as illustrated in FIG. 2A. When the second blade 126 contacts the first blade 124, the energized electromagnet 136 holds the second blade 126 against the first blade 124. In some embodiments, the tab 138 is adjustable to accommodate differing air filtering mode positions. For instance, in some implementations the tab 138 is spring loaded as illustrated herein.

FIG. 2B is a side section view of another embodiment of the air purification system 100, wherein the bypass damper system 110 is in a second air filtering mode position distinct from that shown in FIG. 2A. As illustrated in FIG. 2B, in a second of a plurality of air filtering positions the first blade 124 is in the first position, which covers the room air inlet 102 and the second blade 126 is in a fourth position, which seals against the first blade 124 covering the through holes (or slots) 128 in the first blade 124, as such the two blades act as one damper that does not allow air to pass from the room air inlet 102 into the air purification system 100. In other words, the bypass damper system includes a second air filtering mode position, wherein the second air filtering mode position guides air only from the supply duct inlet through the filter and the outlet. As illustrated in FIG. 2B, in this second air filtering mode, air is drawn exclusively from the supply duct inlet 104. Specifically, this air filtering position of the air inlet damper 122 guides air from the supply duct inlet 104 to pass through the filter 108 and be expelled from the outlet 106, and simultaneously blocks air from passing from the room air inlet 102 into the air purification system 100.

It is noted that when the first blade 124 and second blade 126 are in the second air filtering position, such that air is drawn exclusively from the supply duct inlet (e.g., 104a), this air may be drawn at greater than normal rates typically found in forced air systems and subsequently discharged into the room. As such, the room may be heated or cooled more quickly than if air were also being drawn from the room using the room air inlet 102. Furthermore, in some embodiments, a greater percentage of air is drawn into the room from the forced air system than would be the case under normal circumstances (e.g., under circumstances where no air purification system 100 is used). As such, in addition to quickly achieving a desired room temperature, another advantage of drawing a greater percentage of air from the force air system is to control a positively pressurized room. In a positively pressurized room, potentially contaminated air from outside the room is kept out, and eventually all or essentially all of the air in the room will have been filtered through the air purification system 100 creating a room full of clean air.

In some embodiments, the bypass damper system 110 is controlled by a motor 148, which controls movement of the first blade 124 the first position to the third position and various positions in-between (e.g., as illustrated with respect to FIGS. 1 and 2A). However, FIG. 2B illustrates a simpler embodiment in which a suitably light weight and mass balanced bypass damper system 110 that is motor-less. The movement of the first blade 124 is controlled by air flow pressure and/or a gravity bias. Specifically, the bypass damper system 110 is gravity biased to lie against the room air inlet 102, for instance in some embodiments the gravity bias is 51/49 in favor of lying against the room air inlet 102. In some embodiments, the center of mass of the first blade 124 is controlled by placement of the electro magnet 136 to bias toward the room air inlet 102. Similarly, in some embodiments, the center of mass of the first blade 124 is controlled by weight on an extended lever placed toward the supply air inlet to make the current damper fulcrum point have at least a slight gravity bias that rests at room air inlet 102 when the unit is off.

The motor-less gravity biased bypass damper system will allow air to enter from the room air inlet 102 when the fan 114 pulls as much or more air than is supplied from the supply duct inlet 104. However, with the air from the supply duct flowing behind the air inlet damper 122, and in some embodiments, when combined with its gravity bias toward the room air inlet 102, the room air inlet 102 will close as soon as the air flow from the supply duct is greater than the current speed of the fan 114. In some embodiments, the motor-less gravity biased bypass damper system is then manual reset by the user by pushing the air inlet damper 122 away from the room air inlet 102. In other embodiments, when the pressure from the air from the supply duct 104 decreases, the air inlet damper 122 will naturally tilt back allowing air to enter from the room air inlet 102 again, and thus the air purification system will again receive air from both the supply duct inlet 104 and the room air inlet 102.

As such, when the supply duct pressure is in normal ranges with this unit turned off (or when the unit is on with a fan speed incapable of taking all the supply duct air being pushed by the forced air system blower) the 2 piece air inlet damper 122, bound together by the electro magnet 136, is forced against the room air inlet 102, which seals and prevents air from the supply duct 104 from escaping into the room through the room air inlet 102. Thus only the supply duct air flows through the filters 108, and exits through the outlet 106.

However, if the supply duct pressure reaches a bypass threshold an automatic disengagement occurs: the magnet releases 136 the second blade 126 such that supply duct air can exit through the room air inlet 102 into the room through the holes 128 in the first blade 124 eliminating excess pressure.

In some embodiments, the automatic disengagement occurs as follows: the second blade 126 is held in place, sealed against the first blade 124 by means of an electro magnet 136. In some embodiments, this electro magnet 136 is wired to a pressure sensor 130 (such as a MPL 9371 "snap action" switch described below). The pressure sensor 130 has a bypass pressure threshold, and exceeding the bypass threshold opens switch contacts thereby cutting the electricity to the electromagnet 136, which in turn releases second blade 126 from the first blade 124 thus putting the bypass damper system 110 into the bypass mode position, as illustrated in FIG. 1, which allows air from the supply duct 104 to escape through the room air inlet 102 and relieve pressure.

Figure 2C:
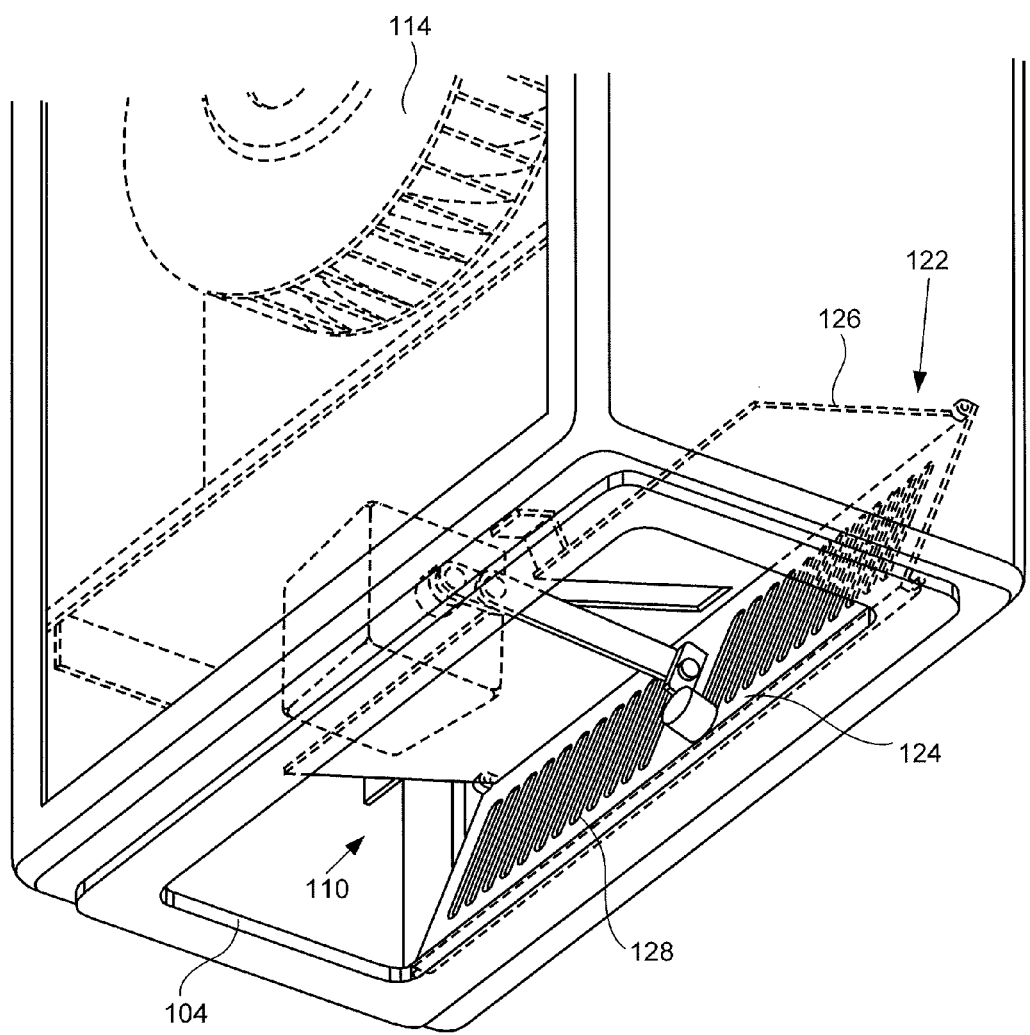
FIG. 2C is a perspective view of the bypass damper system of the embodiment of FIG. 1.

FIG. 2C provides a perspective view of the bypass damper system 110 of the air purification system 100 to more clearly illustrate the functionality of some of the components. This figure illustrates the bypass mode position where the first blade 124 and the second blade 126 are separated from each other. Air entering the system from the supply duct inlet 104 is guided directly into the room, without requiring passage through the filter and outlet, by the second blade and through the through holes (or slots) 128 in the first blade 124.

FIG. 3 is a side section view of an air purification system in accordance with another embodiment of the present invention, wherein the bypass damper system is in a bypass mode position. The embodiment of FIG. 3 is simpler than that of FIGS. 1, 2A, and even the 2B in that the bypass damper system relieves pressurization in the supply duct without using a two blade air inlet damper 122 (see FIG. 1).

FIG. 3 illustrates a bypass damper system 110 that includes a bypass damper 302 (see FIG. 5) and an air inlet damper 304. A protective grill 308 covers the bypass outlet 306 to protect the internal mechanisms of the air purification system 100. The air inlet damper 304 is similar to the air inlet damper 122 of FIG. 1 except that it is a single piece damper without through holes or slots. FIG. 3 illustrates this bypass damper system 110 in the bypass mode position, which allows air to pass into the room through one or more bypass air outlets 306 distinct from the room air inlet 102. The bypass air outlet 306 is configured to be covered and uncovered by the bypass damper 302 for excessive supply duct air pressure relief.

In the bypass mode position, the bypass damper 302 is positioned to expose the one or more bypass air outlets 306. Furthermore, the air inlet damper 304 is positioned to seal the room air inlet 102 and stop air from passing from the room air inlet 102 into the air purification system.

Figure 4:
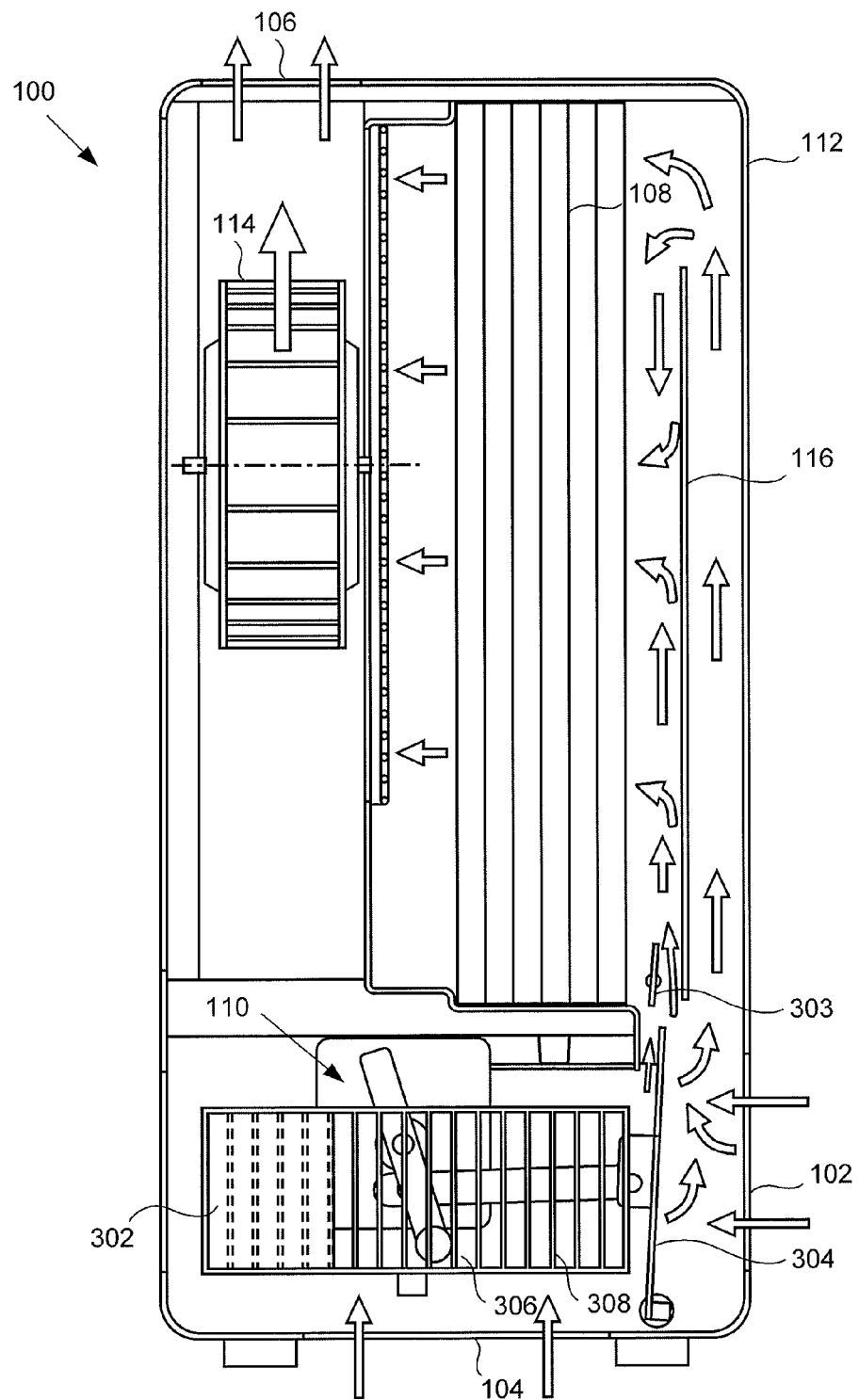
FIG. 4 is a side section view of the embodiment of FIG. 3, wherein the bypass damper system is in an air filtering/purifying mode position.

FIG. 3 also illustrates a check damper 303 shown in a closed position. The check damper 303 is a light weight damper that is gravity biased to remain in the closed position when the bypass damper system 110 is in the bypass mode position. The check damper 303 uniquely placed to prevent flowing supply duct air from sweeping contaminants off the face of the filter 108 and then further carrying them into the room (e.g. through the bypass air outlet 306). As illustrated in FIG. 4, the check damper 303 opens when the bypass damper system is in an air filtering mode position. Essentially, the bypass damper is light enough that it "flies" and thus opens when sufficient air is provided along the air distribution panels (e.g., whenever the air purification system 100 is in an air filtering mode position.) The check damper 303 is installed to the inside of the air distribution channel to disrupt a complete path of air from mixing with and stripping contaminants off of the face of the filter and potentially entering the room. It is noted that OSHA required forced air technicians to wear a face mask and disposable gloves when handling dirty filters because the face of the filter is a bio nest of contaminants. As such, the check damper 303 is included to ensure that the air purification system does not send concentrated contaminants into the room on a stream of air. This is a useful safety feature to be included in this and any unit described herein that connects to a supply duct of a forced air system. For instance this ensures that concentrated contaminants doe not enter the room even when the forced air system is operating and the room air purifier is turned off or unplugged.

FIG. 4 is a side section view of an air purification system 100 in accordance with the embodiment of FIG. 3 the present invention, wherein the bypass damper system 110 is in an air filtering mode position. In the air filtering position, the bypass damper 302 is positioned to seal the one or more bypass air outlets 306. FIG. 4 represents a closed position for the bypass damper 302 by the partial shading. In the air filtering position, the air inlet damper 304 is positioned to expose the room air inlet 102 and guide air from the supply duct inlet 104 and air from the room air inlet 102 to both pass through the filter 108 and the outlet 106, and impede air from passing from the supply duct inlet 104 to the room air inlet 102.

Figure 5:
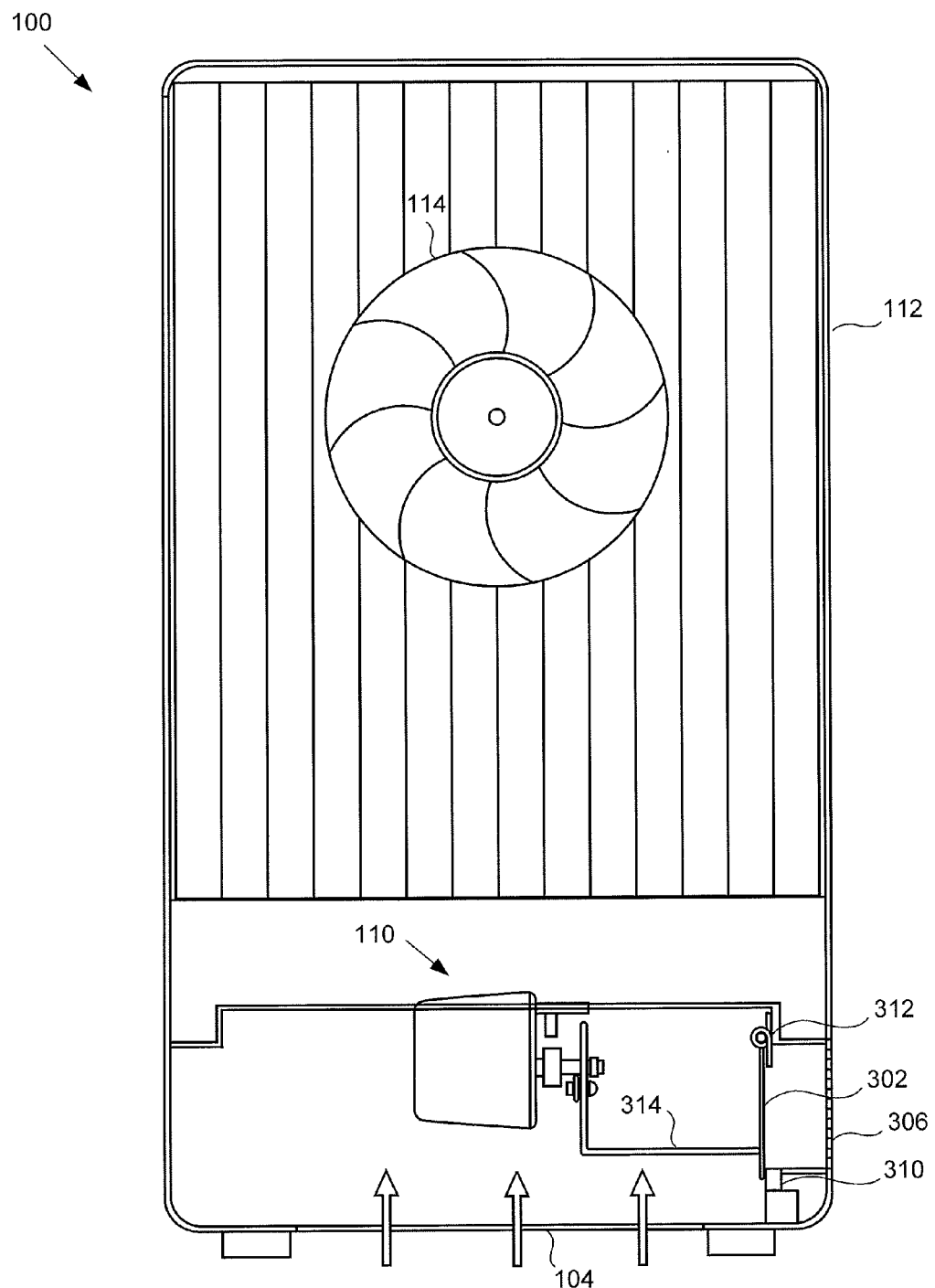
FIG. 5 is a rear section view of the embodiment of FIG. 3, wherein the bypass damper system is in an air filtering/purifying mode position.

FIG. 5 is a rear section view of the embodiment of FIG. 3, wherein the bypass damper system 110 is in an air filtering mode position. In FIG. 5, the bypass damper 302 is shown closed, sealed against a bulk head covering the bypass air outlet 306 and held in place by Electromagnet 310. A spring 312, is biased to open the bypass damper 302 fully when the electromagnet 310 is de-energized (such as when a bypass threshold is exceed). The re-set lever 314 is configured to push against the bypass damper 302, urging it in position to be in contact with, or near enough contact for the energized electromagnet 310 to connect to and hold the bypass damper 302 in place covering the bypass air outlet 306 and overcoming the force of the spring 312. In some embodiments, the re-set lever 314 is in, more or less, continuous contact with the bypass damper 302 and as the lever 314 rotates through positions which place the air inlet damper 304 in its positions the bypass damper 302 is automatically re-set. This automatic re-set allows the bypass damper 302 to open inwardly and allows the protective grill 308 (see FIG. 3) to be attractive and placed on the outside of the unit.

Figure 6:
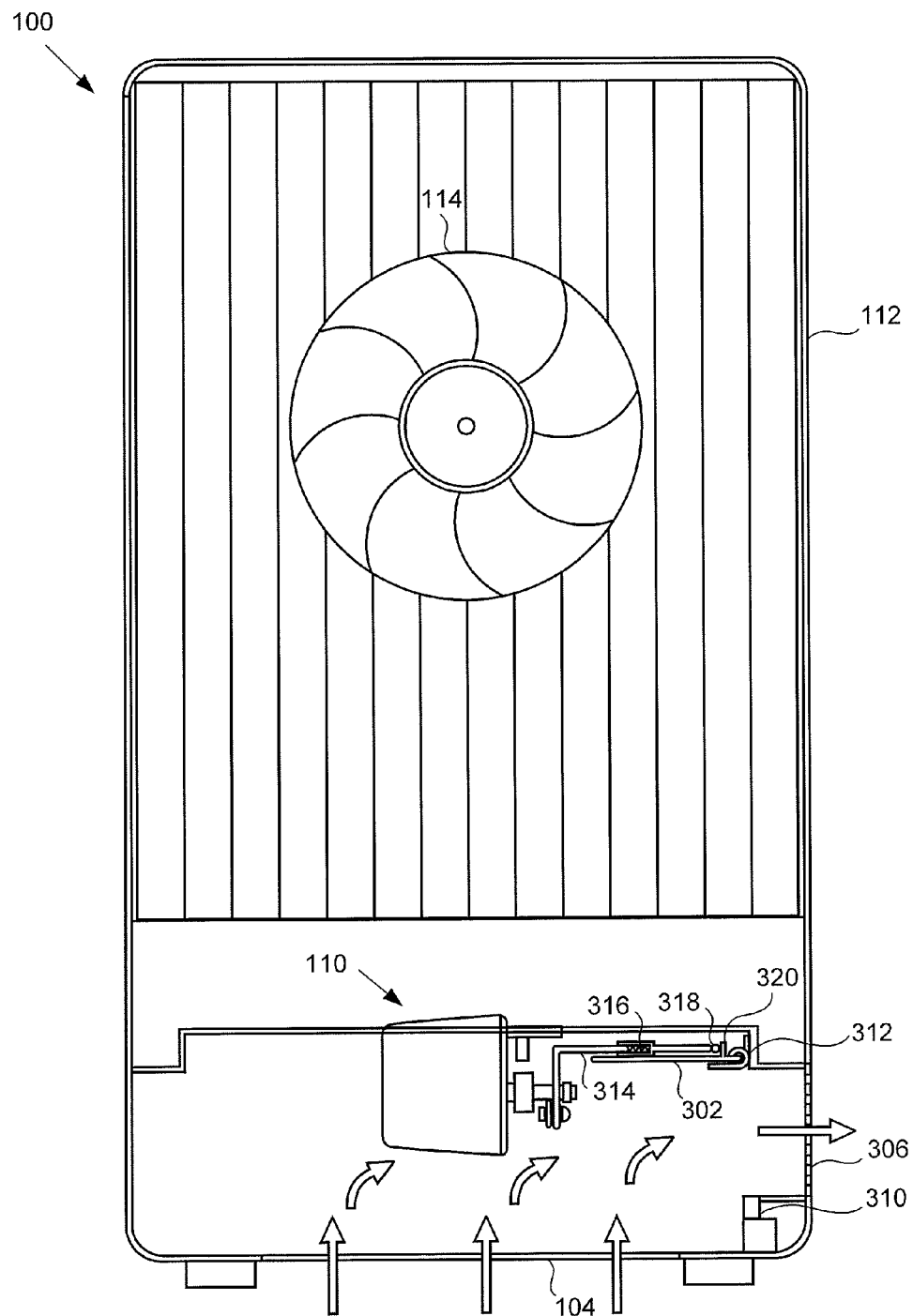
FIG. 6 is a rear section view of the embodiment of FIG. 3, wherein the bypass damper system is in a bypass mode position.

FIG. 6 is a rear section view of the embodiment of FIG. 3, wherein the bypass damper system 110 is in a bypass mode position. In the bypass mode position, the bypass damper 302 is in an open position (uncovering the bypass air outlet 306). The re-set lever 314 is configured to rotate as the air inlet damper 304 is positioned to reduce air flow from the supply duct inlet 104 (See FIG. 3), and the re-set lever 314 stays in contact with the bypass damper 302 until the bypass mode position is attained. FIG. 6 shows the added optional feature of a re-set lever 314 being equipped with a lever spring 316, which is designed to stay in full contact with the bypass damper 302 in the event alignment damage or other tolerances are exceeded for various reasons. Thus, the re-set lever 314 will automatically adjust to minor dimensional changes by use of the lever spring 316 and therefore ensure that the electromagnet 310 is adequately positioned to re-engage the bypass damper 302 when energized. Furthermore, in FIG. 6, a low friction (e.g., nylon) tip 318 is also shown at the end of the re-set lever 314. Friction reduction is beneficial especially during the initial arching/rotation movement of the reset lever 314. A 90 degree tab 320 on the bypass damper 302 is also shown and runs a length of the bypass damper 302, whereby the spring loaded reset lever 314 has the tab 320 to prevent accidental disassembly of the reset lever 314. In some embodiments, the lever spring 316 may also have an internal stop to limit the overall length of the reset lever 314 and eliminate accidental disassembly.

This bypass damper system 110 of FIGS. 3-6, which includes a bypass damper 302 (see FIG. 5) and an air inlet damper 304, is an alternate version of the bypass damper system 110 illustrated in FIGS. 1-2B. However, both types of bypass damper systems 110 are configured to relieve excess supply duct pressure in the bypass air outlet bypass mode position. For instance, as illustrated in FIG. 6, when the pressure from the air in the supply duct inlet 104 exceeds a bypass threshold the bypass damper 302 moves to its spring open position allowing air from the supply duct to pass directly into the room.

Figure 7:
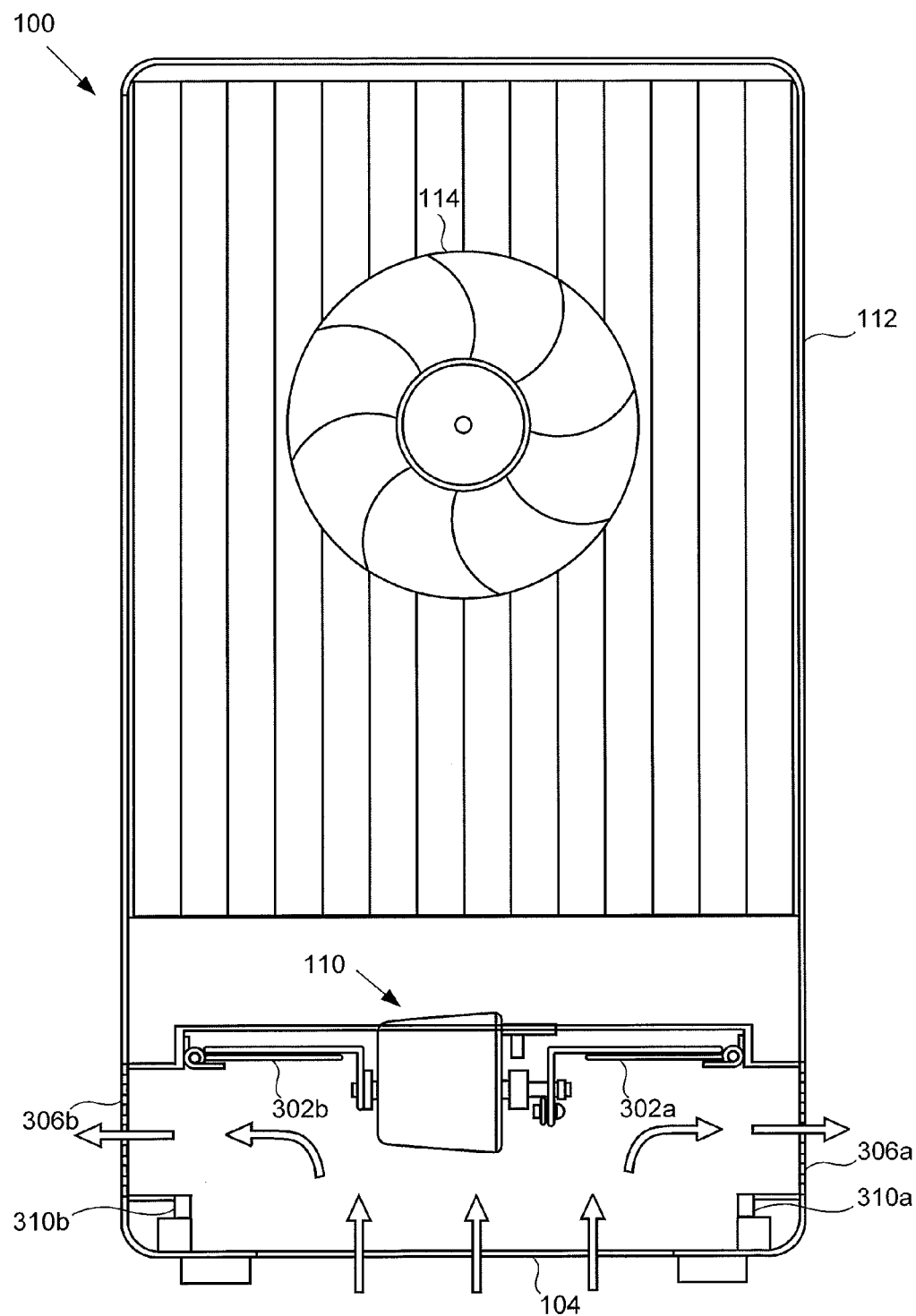
FIG. 7 is a rear section view an air purification system in accordance with another embodiment, wherein the bypass damper system is in a bypass mode position.

FIG. 7 is a rear section view an air purification system 100 in accordance with another embodiment, wherein the bypass damper system 110 is in a bypass mode position. FIG. 7 is quite similar to the embodiments illustrated in FIGS. 3-6 except that there are two bypass dampers 302a and 302b. This two bypass air outlets 306a and 306b allow for quicker and more comprehensive excess supply duct pressure relief.

Figure 8:
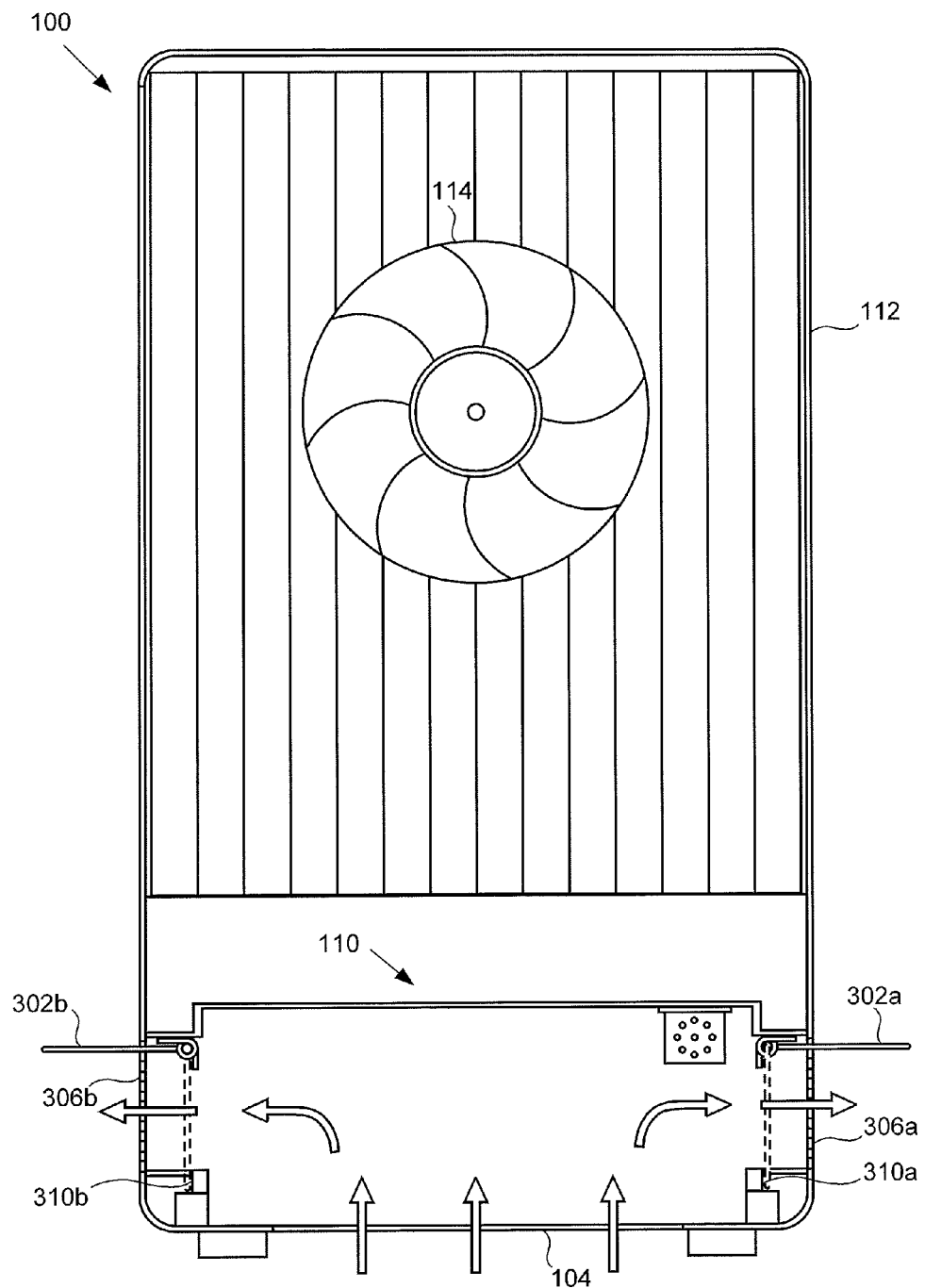
FIG. 8 is a rear section view an air purification system in accordance with yet another embodiment, wherein the bypass damper system is in a bypass mode position.

FIG. 8 is a rear section view of an air purification system 100 in accordance with yet another embodiment, wherein the bypass damper system 110 is in a bypass mode position. FIG. 8 is similar to FIG. 7, in terms of having two bypass dampers 302a, 302b and two bypass air outlets 306a, 306b. However, FIG. 8 illustrates an embodiment in which the bypass dampers 302a, 302b open outward from the air purification system 100 rather than internally. Each is still held by an energized electromagnet 310a, 310b until release conditions are encountered and executed (e.g., the bypass threshold is met). One advantage of the FIG. 8 embodiment is that the bypass dampers 306a, 306B are configured to be manually operated by a user pushing them closed until they latch, either by hand or by broom stick depending on whether the air purification system is covering a floor, wall, or ceiling supply duct register/vent.

Figure 9:
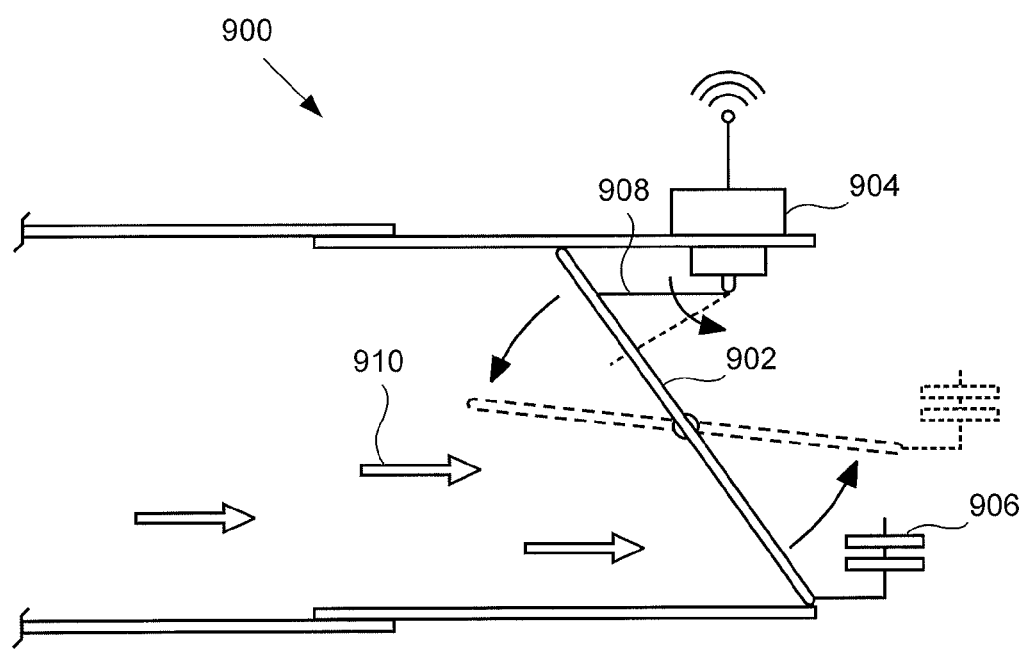
FIG. 9 is a side section view of a gravity bypass damper system.

FIG. 9 is a side section view of a gravity bypass damper system 900 separate from the room air purifier unit. The gravity bypass damper system 900 is installed into the supply air side of a forced air zone, and is configured to relieve any excess pressure that may occur in the supply duct of the forced air system. The gravity bypass damper 900 illustrated in FIG. 9, includes a damper blade 902, a communication module 904, adjustable weights 906, and a micro-switch 908. In some embodiments, the micro switch 908 is configured to turn on the communication module 904 when triggered by movement of the damper blade 906. The adjustable weights 906 are used to control the damper blade 902 into the bypass, by limiting how much pressure is allowed to build up from the forced air supply 910 before the damper blade 902 moves from a first position (shown in solid lines) to a second position (shown in dashed line) where the supply duct air is routed out of the forced air system (such as into the basement).

Re-routing forced air system supply air 910 is one purpose of the gravity bypass damper system 900, but this system also allows for other more elegant solutions explained below. First, it is illustrative to understand when the bypass damper system 900 is utilized. As explained above, some room air purifiers (e.g. System 100, FIG. 1) are equipped with room temperature controls, and are capable of producing independent room zones. The room air purifiers are configured to work in concert with the independent operation of the forced air system. As such, temperature settings applied by a user at each room air purifier unit could be set to conflict with the home's overall thermostat control. Furthermore, although the room air purifiers are configured to typically, continuously, draw approximately one half of what a normal supply duct would normally supply, situations could arise where multiple room air purifiers working in combination will control the supply ducts in such a way to create a situation where supply duct pressure also exceeds a set point. For instance, when the room air purifier units are used to control temperatures significantly above or below the temperature set point of the whole house thermostat, an over pressurization of the forced air supply may occur. For example, if the house thermostat is set at 72 degrees Fahrenheit in the summer, the upstairs zone has 3 bedrooms, and all three bedrooms have room air purifier units installed and set to 75 degrees Fahrenheit, after a time, the bedrooms will warm up to 75 degrees Fahrenheit and then not take much or any 72 degree Fahrenheit additional supply duct air in order to keep the room temperatures at or near the set point of 75 degrees Fahrenheit. The limiting of the supply duct air in all three bedrooms could cause over pressurization in supply duct. Similarly, sometimes users may shut doors and try to create extreme temperature zones room by room, which also may create over pressurization in the supply duct.

As described with respect to the previous figures, one solution is that when a bypass pressure threshold is reached, the air purifier units (e.g. System 100, FIG. 1) will move from an air filtering position to a bypass mode position. Alternatively another solution is that in some embodiments, prior to a bypass pressure threshold to be reached, the gravity bypass damper 900, as shown in FIG. 9, will dump the conditioned air, outside, into the basement, or into a return air duct. In some embodiments, the gravity bypass damper 900 is configured to relieve the excess pressure by moving a damper blade 902 from a first position to a second position where the supply duct air is routed out of the forced air system (such as into the basement). The threshold for this movement of the damper blade 902 is controlled by the adjustable weights 906. However, in some embodiments, the gravity bypass damper 900 of FIG. 9 also offers another more elegant solution to supply duct over pressurization and temperature set point mismatches than dumping the air into the basement (or similar external location) as explained below.

FIG. 9 illustrates a bypass damper 900 that utilizes a communications module 904. In homes with multiple zones, a by-pass damper 900 may be installed in the supply side of the forced air system before the forced air reaches any rooms. In some embodiments, this bypass damper 900 is a gravity type/weighted, is mechanically based or has pressure sensors to activate a motor drive to open it to a specific point, and then later, closed again at another point. This by-pass damper 900 relieves excess duct pressure to insure a proper amount of air is moved by the forced air system and re-circulated through the system. The by-pass damper 900 may dump air into a basement to be picked up by a return air duct, for example or the by-pass damper can dump the air directly into the return air ducting at a preferable location in the return duct. The by-pass damper 900 is one method to insure proper movement of air through the forced air system while also not exceeding the forced air systems duct pressure manufacturer's specifications. Sometimes a by-pass damper 900 is not enough and forced air systems can be abused to the point of failure. Dirty filters, for example, can restrict the amount of air circulation and cause cooling components to freeze and heating components to overheat and possibly become damaged.

The forced air system professional can install forced air systems with alarms and service reminders, like filter monitors and cooling coil and heat exchanger temperature sensors to warn or even shut down the system, if necessary, to prevent damage to the system. These sensors can be installed as accessories at any time, as well. Supply duct pressure on the other hand may not even be checked when a system is first installed.

FIG. 9 illustrates a bypass damper 900 that utilizes a communications module 904 to overcome some of the above mentioned issues. The communications module 904 capable of communication with room air purifier units in the home by utilizing the communication module 904. For example, in some embodiments, the communication module 904 is in communication with an electronic controller 132 of one or more room air purifier units (e.g. FIG. 1, 100). Rather than waste conditioned air by dumping it into the basement if supply duct pressures are exceeded, the communication module 904 communicates with the room air purifier unit's electronic controller 132 to change its air flow profile.

In some embodiments the bypass damper 900 detects the by-pass damper movement 902, (e.g. by means of the consequent movement of the micro switch 908 from an off position shown in solid lines to an on position shown in dashed lines). The communication module 904 then begins communicating with the air purifier unit's electronic controller 132 to change its air flow profile and thus allow the bypass damper 902 to return to its original position (of allowing forced air system supply air 910 to reach the room air purifiers).

For instance, in some embodiments, an individual room air purifier unit in communication with the communications module of the 904 of the bypass damper 900 will respond by:
  Increasing fan speed. In some embodiments, the fan speed is increased to double or triple a single supply duct's air flow to mimic multiple supply ducts in full flow operation.
  Changing bypass damper system 110 position to draw more supply duct air.
  Or both.

In some embodiments, if a bypass damper system 110 of one or more of the units 100 has already moved into a bypass mode position, the bypass damper's 900 communication module 904 directs the unit's damper system 110 to reduce or eliminate the bypass mode air flow and draw more supply air through the unit 100.

As such, in some embodiments, the room air purifier unit's bypass damper system 110 working in conjunction with an increased fan 114, eliminates or minimizes the discharge by the bypass damper 900. As such, pressure is relived in the forced air system supply air without wasting it by dumping it into the basement or elsewhere outside the system.

Furthermore, in some embodiments multiple room air purifier units can coordinate to perform these functions. As such, there is achieved little or no undesirable impact on room temperature versus user controlled room temperature set points thus overcoming the issues described previously. In some embodiments, the communication module 904 individually directs the activities of multiple air purifier units to achieve an overall optimal outcome for the home.

FIGS. 10A-10F illustrate the components of the air purification system 100 that provide convenient filter disposal. In some embodiments, the system 100 includes a filter door 1002 (FIG. 1 OA) located at the top of the unit for ease of filter changes. The door 1002 exposes a filter compartment 1004. The door handle is also configured to hold a disposable bag 1006 and a tool 1008 to remove the filters 1010 (FIG. 10B). The tool 1008 removes the filters with a lift handle 1012 and a foot 1014 for the filters to sit on. In some embodiments, the tool 1008 is of sufficient thickness (e.g., 0.0625 in) to put a squeeze on the filter(s) 1010, when inserted. The squeezing action creates a seal around the filters 1010 allowing for easier disposal. Furthermore, in some embodiments the tool 1008 has permanent seals on either or both sides to create the filter seals needed (FIG. 10D).

It is noted that the top access filter door 1002 also helps remove filters and insert them into the bag 1006 while minimizing contaminants dropping off of the filter 1010 and into the room. A bag catch may also serve as a door opener handle and this latch can hold the bag 1006, which is especially helpful in a ceiling mounted air purifier servicing a ceiling register. Consequently, in action, the filters 1010 slide out of the air purifier and into the bag 1006. The filter removal tool 1008 does triple duty by lifting out individual filters 1010, holding the bag with a lift handle 1012 and the tool 1008 also serves as a wedge between filters 1010 to enhance the seals between filters and against the filter housing.

Figure 11:
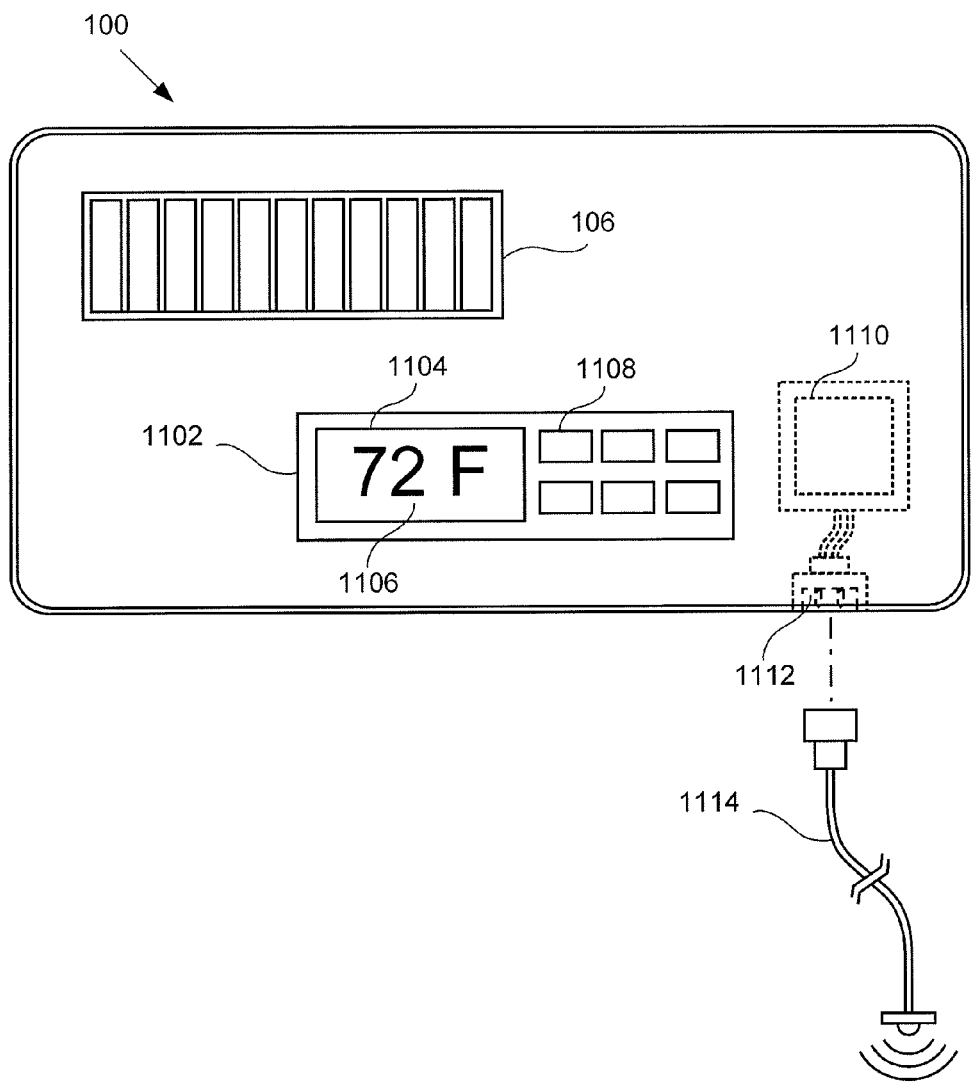
FIG. 11 is a top view of an air purification system in accordance with some embodiments.

FIG. 11 is a rendering of the top of an air purification system 100 in accordance with some embodiments. The top located outlet 106 is illustrated. The system may also include a communication panel 1102. In some embodiments, the communication panel includes a display screen 1104, which provides various communications/user messages 1106 to the user such as the current temperature of the room, the pressure in the system, and warning messages such as when a door should be opened or a filter should be changed. The communications panel 1102 may also include one or more input means such as buttons 1108. The input means can be used to input set points for the system 100, such as a desired room temperature. The system's microprocessor control 1110 is shown ghosted and includes a longer range communications antenna connection port plug 1112. In some embodiments, the communications panel 1102 is provided on a separate remote control unit rather than on the top of the system 100. This remote control unit is especially useful for ceiling mounted systems 100. In such embodiments, the remote will communicate to the system 100 via an antenna 1114 attached to the connection port 1112. In some embodiments, the remote may also communicate by wire. In some embodiments, the remote includes the room temperature sensor to provide means to optimally locate the sensor to reflect conditions similar to the homes forced air system thermostat, e.g. a median distance above the floor.

FIG. 12 is a perspective view of an air purification system 100 in accordance with still another embodiment. The bypass damper system 110 is a gravity bypass damper 322. With the gravity bypass damper 322 no pressure sensor is needed to activate the bypass damper because it is held in place by gravity and a certain amount of weight 1202—corresponding to the bypass threshold releases the damper 322. In some embodiments, a latch 1206 is released and a spring 1204 opens the gravity bypass damper door 1208 when the threshold is reached. Then the door 1208 is manually closed and the latch 1210 is reattached by the user. In other embodiments, the damper door 1208 flies freely, and it automatically closes by gravity when the air pressure is relieved. This embodiment is simpler and cheaper to implement than some of the aforementioned bypass damper systems 110. The gravity bypass damper 322 is hinged to work with gravity for vertical, horizontal or even upside down mounting requirements. It is noted, that other than the simpler gravity bypass damper 322, in some embodiments the elements of the air purification system 100 in FIG. 12 are the same as those illustrated in FIG. 3. For instance, the unit includes the air inlet damper 304 and the check damper.

Figure 13:
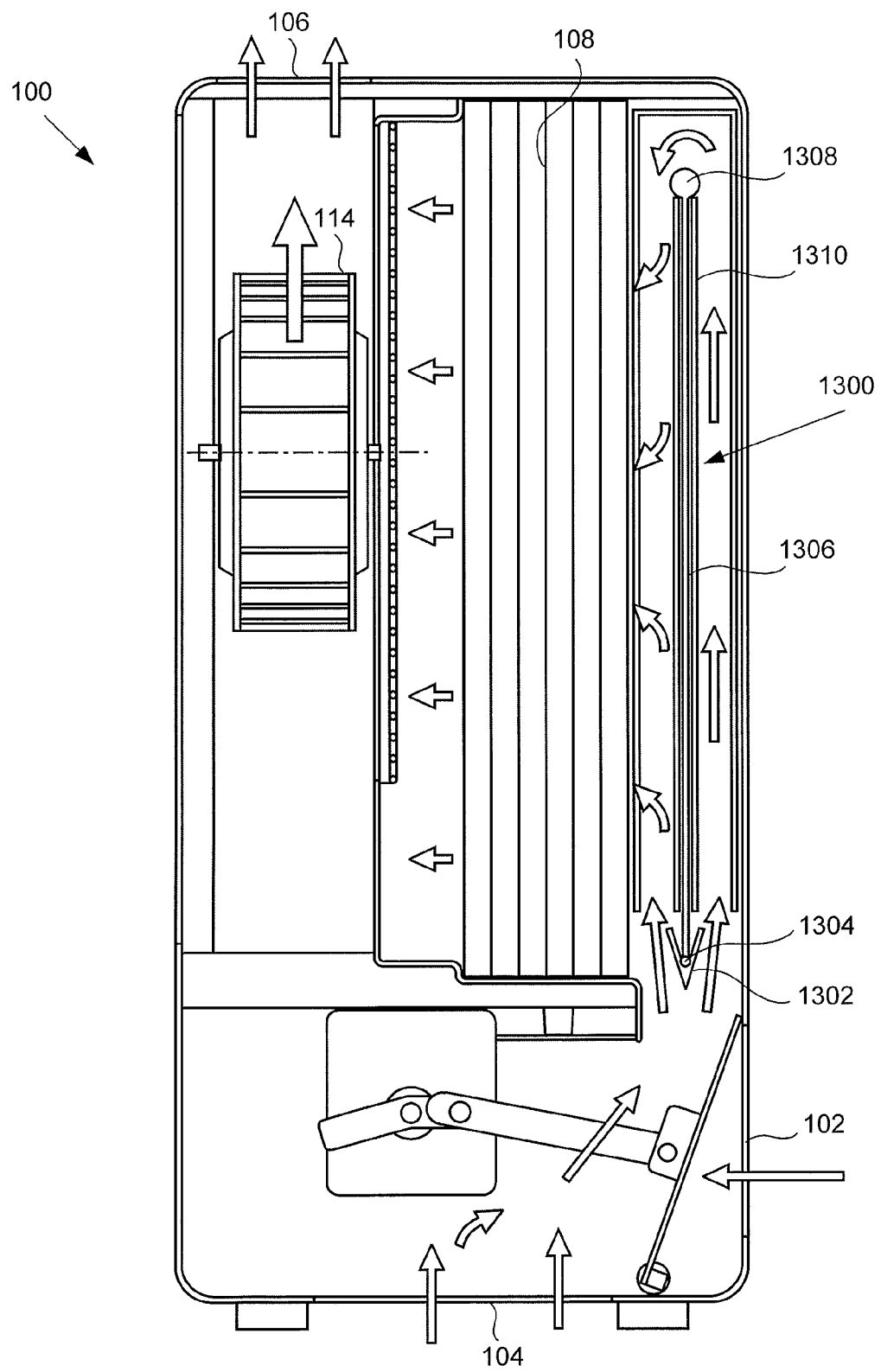
FIG. 13 is a side section view of an enhanced air distribution channel for the air purification system.

FIG. 13 illustrates an enhanced air distribution channel 1300 for the air purification system. The air distribution channel 1300 illustrated in FIG. 13 is similar to the air distribution panel 116 illustrated in FIG. 1 except that it has several improvements. For instance the air distribution channel 1300 includes a "V" shaped louver 1302 attached to a hinge 1304. The "V" shaped louver 1302 is configured so that when the air flow on one side is of the distribution channel plate 1306 is greater than the other side, the point of the "V" of the louver 1302 will move into the flow of air on the higher flowing side. This movement will consequently restrict the flow of air to that side and therefore approximately equally split the airflow on either side of the channel plate 1306. In some embodiments, louver 1302 is configured to optimally operate between 100 and 250 cfm. Furthermore, the top of the air distribution channel plate 1306 has a rounded edge 1308 to reduce air velocity noise and enhance flow over the top and into the filter area. Finally, as illustrated more clearly in FIG. 15, in some embodiments, the air distribution channel 1300 also includes laminar flow channels 1310.

Figure 14:
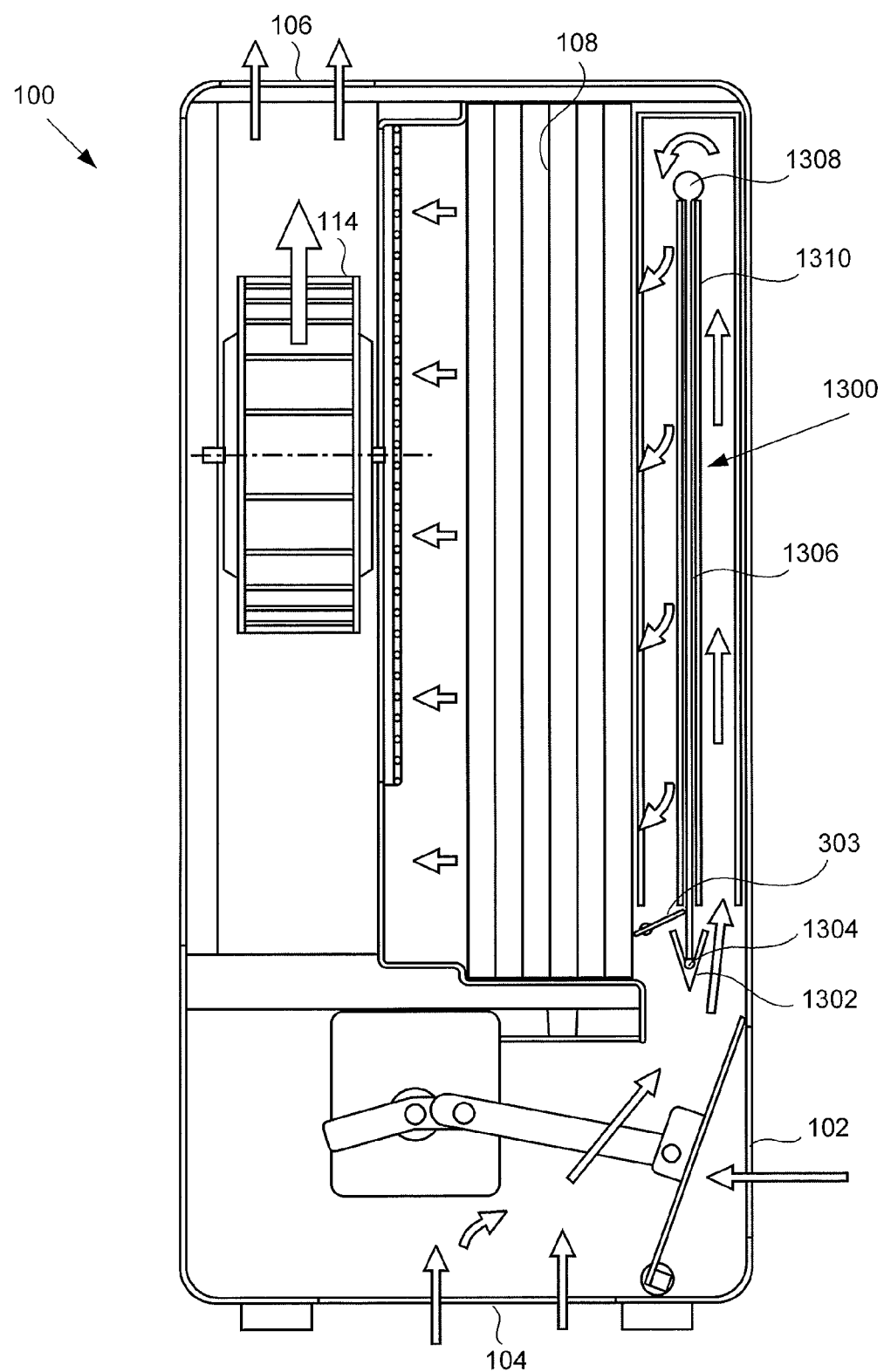
FIG. 14 is a side section view of an embodiment similar to the embodiment of FIG. 13 with the addition of a check damper.

FIG. 14 is similar to FIG. 13, but also includes the addition of a check damper 303. The addition of the check damper 303 influences the flow of air along the distribution channel plate 1306, as all of the air first passes on one side and is then distributed across the filters 108 on the opposite side of the distribution channel plate 1306. It is noted that any of the models illustrated and described above (e.g., the models illustrated in FIG. 1, FIG. 3, FIG. 7, FIG. 8, and FIG. 12) can use the FIGS. 13 and 14 air distribution channel 1300 with the laminar flow channels 1310, and the "V" shaped louver 1302 and the rounded edged 1308 together or independently. The check damper configuration is advantageous in all of these models to block the release of contaminants from the face of the filters 108. The check damper 303 is especially advantageous in any model that does not, by other means, block supply duct air from mixing with and releasing contaminants on the face of the filters 108 into the room during certain circumstances or malfunctions. For instance, it is especially advantageous in the FIG. 3 and FIG. 12 models for example.

Figure 15:
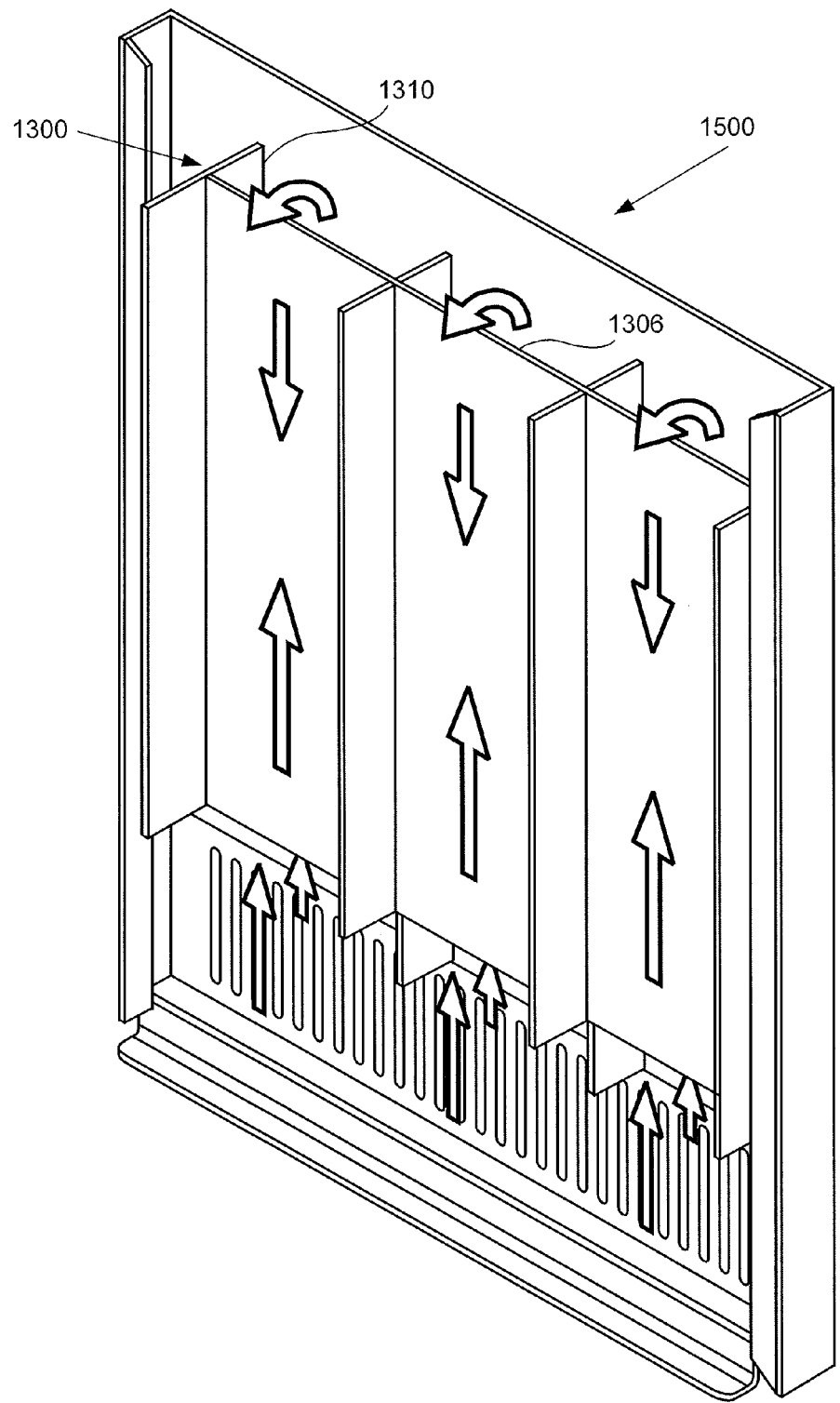
FIG. 15 is a perspective view of the air purification system's front panel.

FIG. 15 is a perspective view of the air purification system's front panel 1500 with the air distribution channels 1300 attached to it. This figure illustrates laminar flow air channels 1310 on each side of the air distribution channel plate 1306. As discussed above, the laminar flow air channels 1310 reduce air turbulence and provide a smoother flow of air on both sides of the air distribution channel plate 1306. As illustrated in FIG. 15, the total air flow is divided among the multiple laminar flow air channels 1310 and thus delivered equally across the face of the filter. In some embodiments, the laminar for flow air channels 1310 are not evenly spaced as shown herein, but are still spaced so as to distribute air approximately evenly across the face of the filter. As such the laminar flow air channels 1310 are configured to use the filters full surface area most effectively for collecting, absorbing, and providing optimum air flow over the broadest possible surface area of the filter. For instance, without the laminar flow air channels 1310, the majority of the air may pass through the bottom third of the filter causing accelerated flow rates and less effective contaminate collection and absorption.

Figure 16:
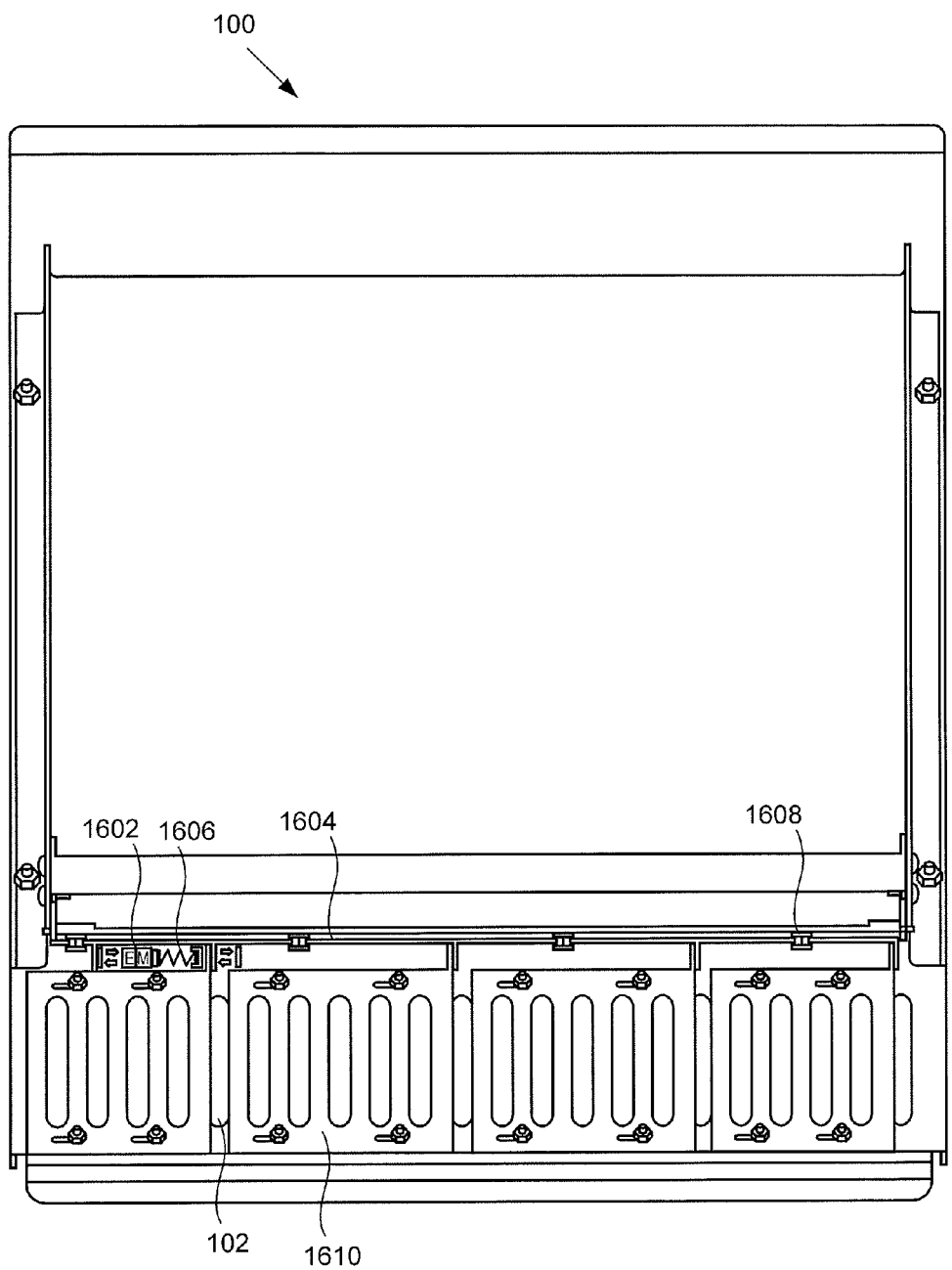
FIG. 16 is an internal side view of an air purification system pressure control mechanism.

FIG. 16 is an illustration of an air purification system pressure control mechanism in which an electro magnet 1602 holds an actuator bar 1604, which is biased with a spring 1606 in an air filtering position (see right pointing arrows). The actuator bar 1604 moves freely inside nylon bushings 1608.

In some embodiments, when the system 100 has power and is turned "on" all of the louvers 1610 over the air inlet 102 are shut. Then if power is cut, if the unit is turned "off", if a supply duct over-pressure sensor exceeds a high limit set point, or some other particular failure mode takes place, the electro magnet 1602 can release the spring 1606 loaded which releases actuator bar 1604 and all of the adjustable slide louvers 1610 are pushed to a fully "open" position simultaneously (see left pointing arrows.)

Figure 17:
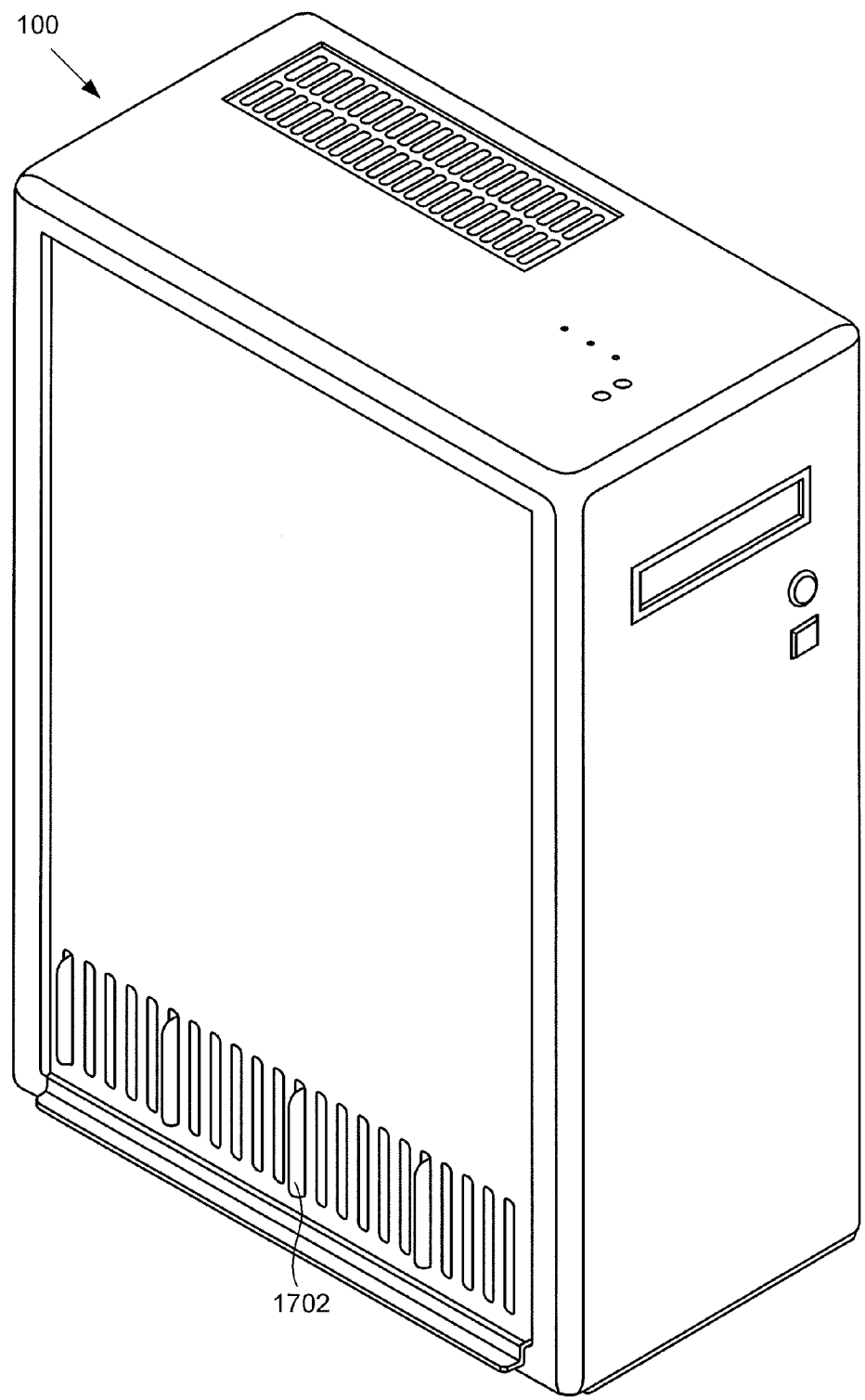
FIG. 17 is a perspective view of the outside of an air purification system with a manual reset option for the pressure control mechanism.

FIG. 17 is an illustration of the air purification system with supply duct outlets that have louvers 1702 with exterior handles. As such, a user can manually reset the actuator bar against the electromagnet (in FIG. 16) by fully sliding any of the louvers 1610 to a fully closed position when the electromagnet is energized to hold the actuator bar in a normal ready state.

Figure 18:
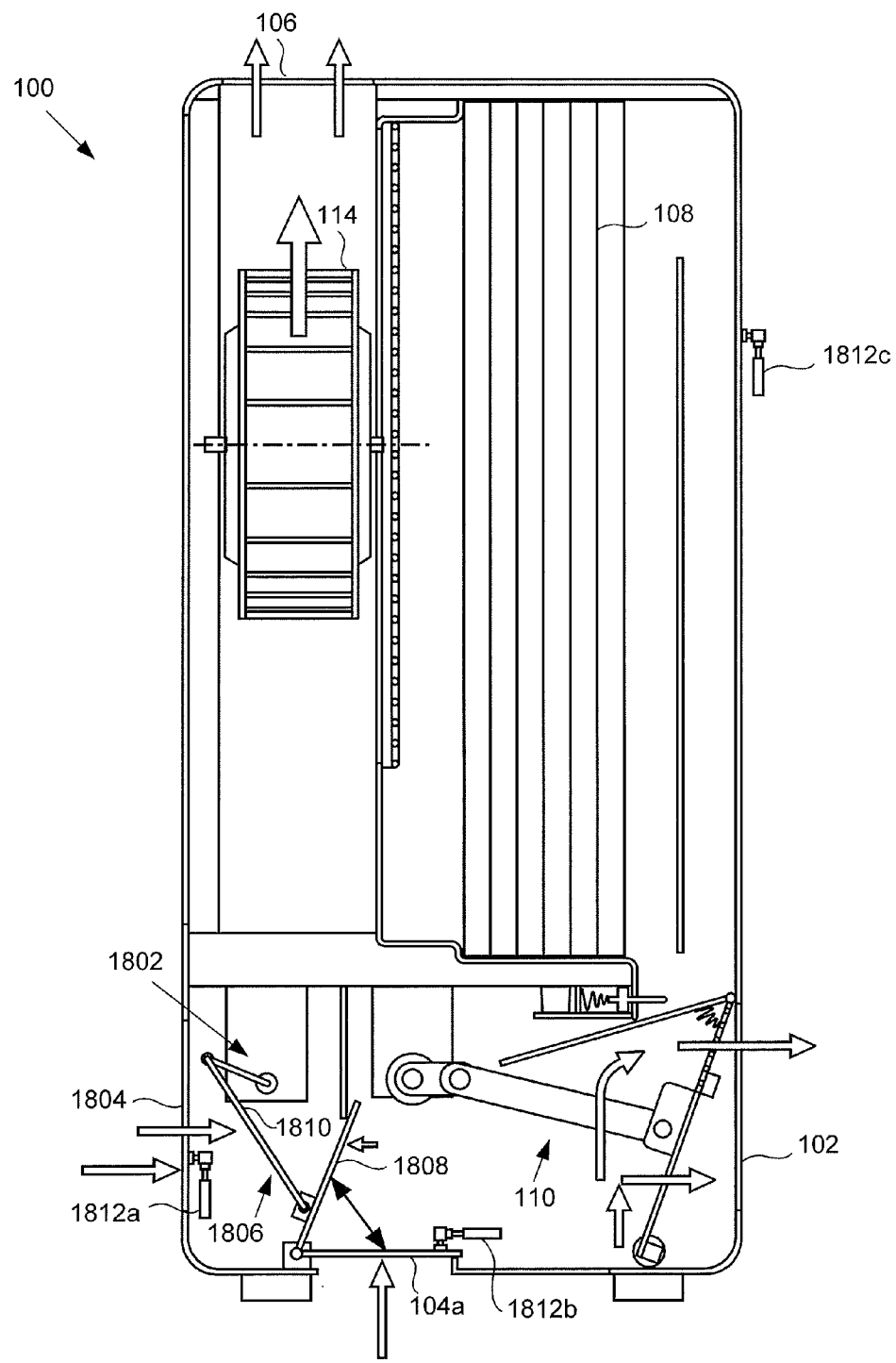
FIG. 18 is a side section view of another embodiment of an air purification system.

FIG. 18 illustrates another embodiment of an air purification system 100 in which a second damper system 1802 is utilized in addition to the bypass damper system 110 described with respect to FIGS. 1 and 2A-2C. The second damper system 1802 allows air to be supplied from a forced air system supply duct inlet 104*a* and an additional supply air inlet 1804. The blade 1808 is configured to cover and uncover the forced air system supply duct inlet 104*a* and is configured to cover and uncover the additional supply air inlet 1804. The second damper system can be moved from obtaining all air from the forced air system supply duct inlet 104*a*, all air from the additional supply air inlet 1804 or various combinations of both.

In some embodiments, the second supply air inlet 1804 is configured to receive air from outdoors/outside the home or from another room. It may be beneficial to draw air from outdoors because the outside air quality measured by a sensor, timed or manually triggered may be better than the indoor air quality. For instance, the fresh outside air may not have some of the household chemicals like cleaning aerosols or fresheners sometimes found in high concentrations indoors. Therefore, in some instances, outside air is higher quality air than room or supply duct air and would require less filtering. As such, in some embodiments, it is beneficial to allow a system 100 to draw outside air for the purpose of providing higher quality air into the room or room air purification system.

Furthermore, in some embodiments, the air outside the room or the outdoor ambient air may be useful to help achieve a desired room set point temperature. For instance, if room air set point temperature is 72 degrees Fahrenheit and the room is currently at 78 degrees Fahrenheit, if outside/outdoors air is less than 78 degrees, for example 65 degrees Fahrenheit, then outside air can be utilized to reach the set point and minimize the necessity for air conditioning. Thus, in some embodiments, utilizing the outside air is a cleaner and greener/more energy efficient way to achieve a desired room temperature and air quality level.

For example, the second damper system 1802 may be used as follows: when the outdoor air from the supply air inlet 1804, as measured by the first temperature sensor 1812*a*, is cooler than the air from the supply duct inlet 104*a*, as measured by a second temperature sensor 1812*b*, and is also cooler than room's ambient temperature, as measured by the third temperature sensor 1812*c*, (and less than the user's desired set point temperature for the room), then the second damper system 1802 would move the blade 1808 to close off the supply duct inlet 104*a* completely and simultaneously move the blade 1808 to open the supply air inlet 1804 such that the cooler air from the outside would help cool a room without utilizing the air conditioner and thus saving energy. Similarly, warm outside air can be used to heat a room to a desired temperature.

In some embodiments, the outside air, filtered and released into the room would provide continuous positive pressure to the room while the supply duct inlet 104*a* is closed.

In some embodiments, the temperature sensors 1812*a* and 1812*b* are positioned inside the system 100 and thus may require that blade 1808 of the second damper system 1802 periodically unseal the respective inlets in order to sample the temperature of the air in the respective supply ducts. In other embodiments a small hole is provided in each respective damper, this controlled air leakage through the holes is used by the temperature sensors 1812*a* and 1812*b*.

In some embodiments, other outside air sensors are used, which include humidity sensors and air pollution sensors. In some embodiments, when humidity sensors are used, and a significant disparity in humidity is measured between the outside air and the supply duct air, air from the 2 sources can be blended to achieve a desired temperature and humidity level. For instance, the second damper system 1802 may use cool humid air from the outside and blend it with drier indoor supply duct air in a ratio to not overly humidify the room or the house for that matter while still achieving a desired temperature for the room.

Figure 19A:
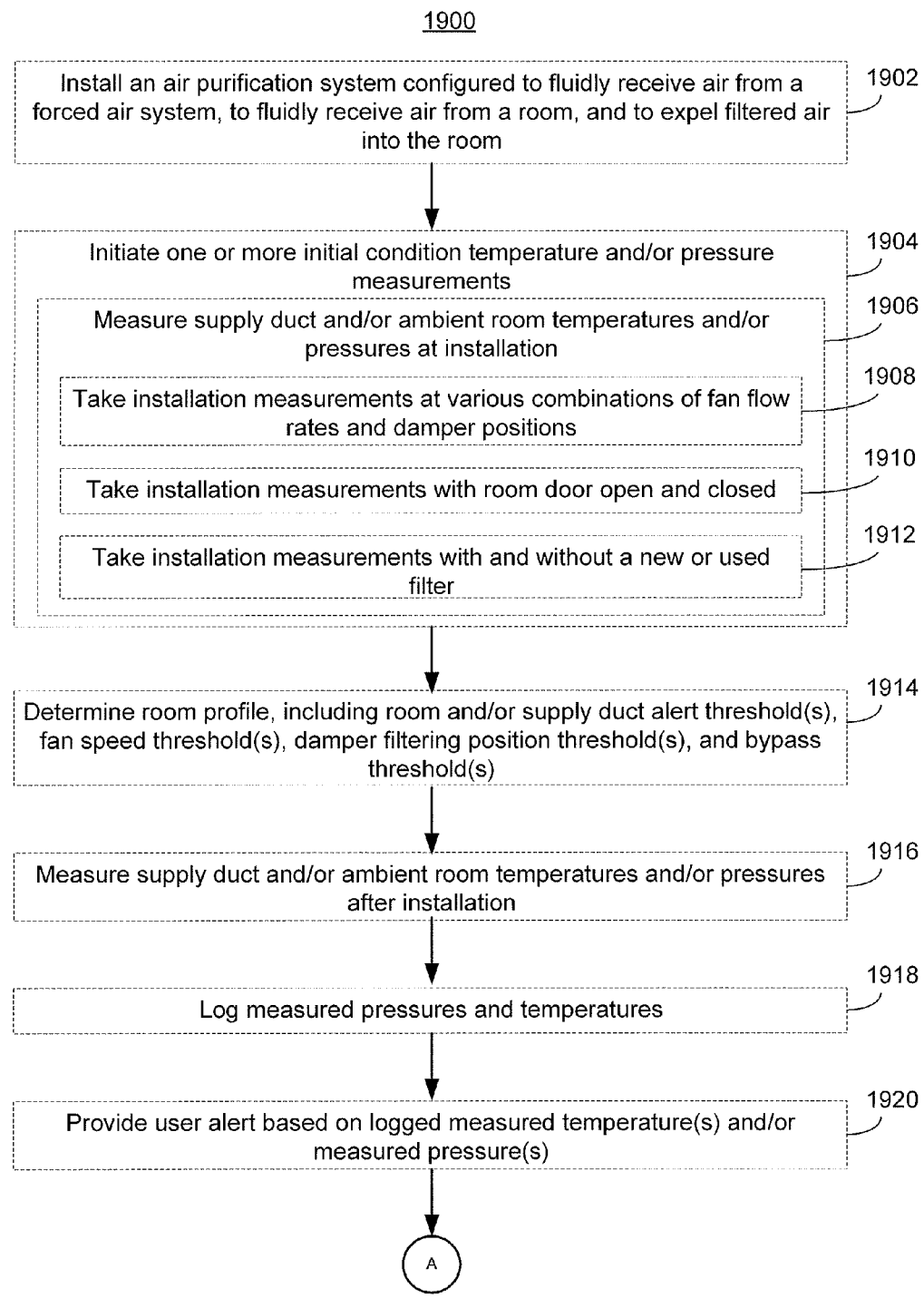
FIGS. 19A-19B are flowcharts illustrating a methods of providing pressure relief and alerts and action in accordance with some embodiments.
Figure 19B:
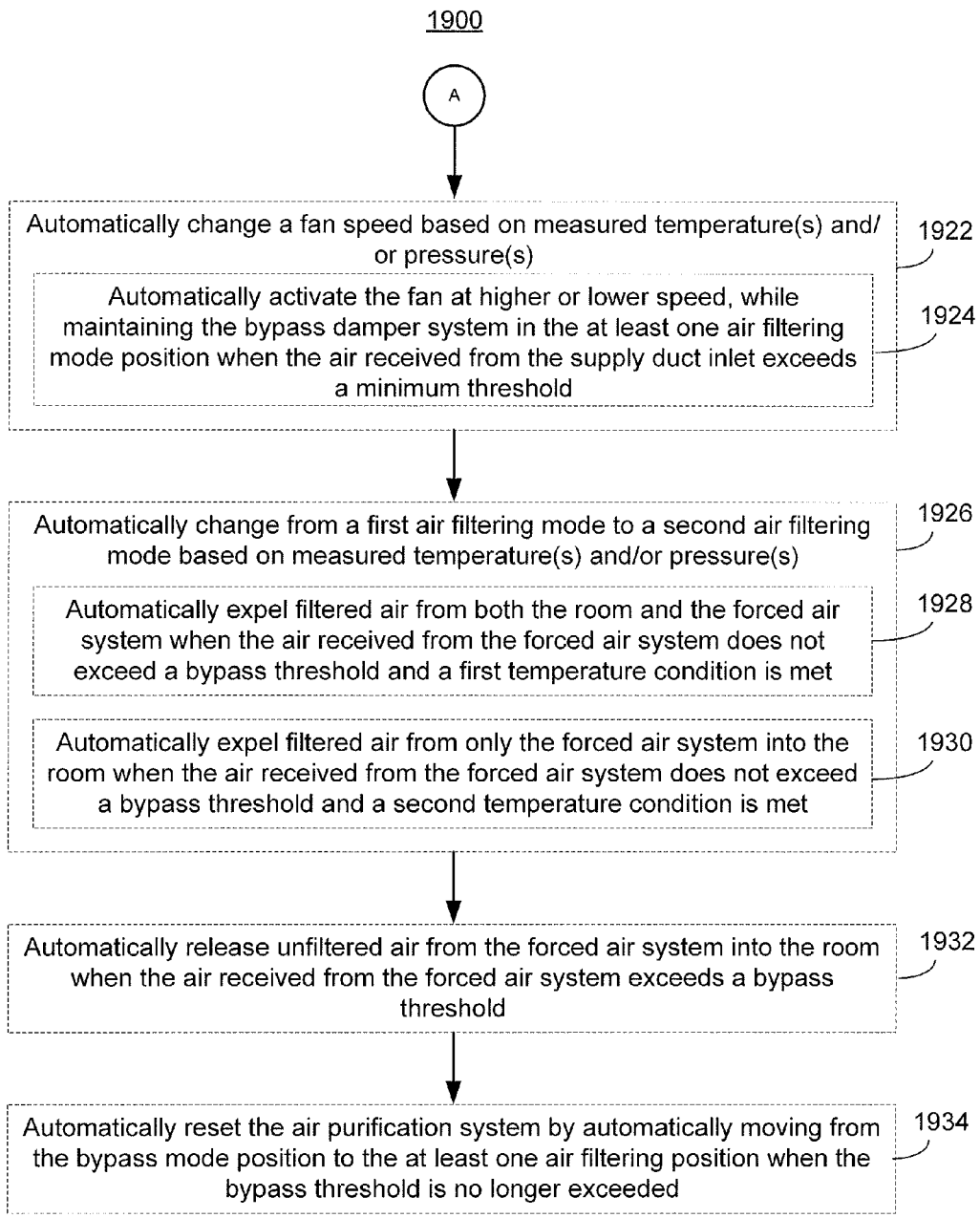

FIGS. 19A-19B are a flowcharts illustrating a methods 1900 of providing pressure relief and alerts in accordance with some embodiments. The description of these methods is meant to provide an easy reference for the method of operation of the air purification systems described with reference to FIGS. 1-18 above and is not meant to be limiting to only the methods described herein. These methods 1900 are typically governed by instructions that are stored in a computer readable storage medium and that are executed by one or more processors within the electronic controller 132. Each of the operations shown in FIGS. 19A-19B typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by the one or more processors of the controller 132.

The method 1900 begins by providing an air purification system 1902. As described above, the air purification system is configured to fluidly receive air from a forced air system, to fluidly receive air from a room, and to expel filtered air into the room. In some embodiments, the air purification system is initially installed to be in fluid connection with a forced air system in this step.

In some embodiments, one or more initial condition temperature measurements and/or pressure measurements are taken 1904. In some embodiments, one or more initial air pressures are measured from the forced air system supply duct. Likewise, one or more initial room air pressures are measured. Furthermore, in some embodiments, one or more room air temperatures and supply duct temperatures are also measured.

Sometimes supply duct temperatures and/or pressures are measured at installation 1906. Furthermore, sometimes and ambient room temperatures and/or pressures are also measured 1906. In some embodiments, installation measurements are taken at various combinations of fan flow rates and damper positions 1908. Likewise, in some embodiments, installation measurements are taken with room door open and closed 1910. Furthermore, in some embodiment installation measurements are taken with and without a filter 1912. In some implementations, the filter is new, while in other implementations the filter is used. For instance, in some embodiments, during the room air purification system installation with the customer follows prompts to open and close the room door(s), removing filters, installing new filters, etc. while the air purification system unit runs combinations of fan flow rates and damper positions, logs and interprets the data. The initial measurements are typically performed for only a diagnostic period of time, long enough to get a steady reading, e.g. 5 minutes.

Then the system determines a room profile which includes one or more thresholds in which actions will be performed 1914. For instance in some thresholds determined include alert thresholds, thresholds which trigger an increased fan speed, damper filtering position thresholds (e.g. to move from one filtering position to another), and bypass thresholds. For instance, the initial temperature and/or pressure measurements are used to establish the maximum room pressure threshold value in some embodiments. It is further noted that in some embodiments flow measurements are adjusted to account for the air density effects caused by temperature and altitude. For instance, the initial pressure data collected is normalized to a range of standard temperatures in the supply duct.

Then after installation supply duct temperatures and/or pressures are measured 1916. Furthermore, the ambient room temperatures and/or pressures are also measured 1916. All of the measurements, both before and after the installation, are logged 1918.

In some embodiments, various alerts are provided to the user based on the initial/installation measurements and the later measurements 1920. The alerts are provided based on various thresholds being met. For instance, alerts may include: an air filter changing recommendation, a temperature setting recommendation, a repair/service recommendation, a room door opening recommendation, and a refrigerant replacement/addition recommendation. Furthermore, room air temperature can be compared to supply duct air temperature. For example, if the room temperature is 72 degrees Fahrenheit and the supply duct temperature cooling that room is only 8 degrees less (62 to 64 degrees Fahrenheit), then a "call for service" alert may appear. For instance, when there is only a 8 to 10 degree difference there may be an under-insulated supply duct or unsealed supply duct that goes through a hot attic or other reasons for this low delta in temperatures. After various measurements are run by the air purification system, the alerts may suggest that the consumer check the forced air system for malfunction (e.g. faulty coil or compressor). As such, the air purification system provides helpful, money and energy saving alerts to the user regarding not only the air purification system itself, but also alerts regarding the forced air system to which it is installed.

Furthermore, in some embodiments, a fan speed is automatically changed based on measured temperature(s) and/or pressure(s) 1922. For instance, in some embodiments, the fan is automatically activated at high speed, while maintaining the bypass damper system in the at least one air filtering mode position when the air received from the supply duct inlet exceeds a minimum threshold 1924. In other embodiments, the fan speed is automatically activated to a lower speed when the room door remains shut thereby forcing other room supply duct registers to increase flow and potentially return more air to the forced air system. For instance, when the supply duct temperature and the room air temperature difference reach a minimum difference between the two, e.g. 10 degrees Fahrenheit, over a shortened period of time, e.g. hours or maybe a few days, a coil may be freezing. This may be the result of a rapid loss of ac refrigerant or the room door being closed and the return air flow to the forced air system being just restricted enough, that in combination with other circumstances, causes a problem that appears relatively rapidly. Lowering the fan speed and or closing/restricting the air from the supply duct will force other supply duct registers in other rooms to get additional air flow from the HVAC system, return it, and thus help the situation.

In some embodiments, when the user's chosen room temperature is not being reached as intended, after several rounds of forced air cool or warm cycles, then the fan speeds are automatically increased, and the damper is automatically reposition to draw more supply duct air in ratio to the room air when both are being drawn. This allows the room to equalize temperature with the rest of the home and more likely to get to the room set point desired temperature during the next forced air "on" cycle.

In some embodiments, the system automatically changes from a first air filtering mode to a second air filtering mode based on measured temperature(s) and/or pressure(s) 1926. For instance, the system automatically expels filtered air received from both the room and from the forced air system when the air received from the forced air system does not exceed a bypass threshold and a first temperature condition is met 1928. And the system automatically expels filtered air received from only the forced air system into the room when the air received from the forced air system does not exceed a bypass threshold and a second temperature condition is met 1930.

However, when the bypass threshold is met, the system automatically releases unfiltered air received from the forced air system into the room 1932. Thus, the release of pressure when a bypass threshold is met allows the air purification system to protect the forced air system from over pressurization.

Finally, in some embodiments, the air purification system also automatically resets itself back to an air filtering mode position when the bypass threshold is no longer exceeded. Thus, the system is configured to easily and safely provide cleaned, filtered, and purified air to a room quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An air purification system with over pressurization relief capabilities comprising:
    a room air inlet configured to fluidly receive air from a room;
    a supply duct inlet configured to fluidly receive air from a forced air system;
    an air filter configured to filter air received from the room air inlet and/or the supply duct inlet;
    an outlet configured to expel filtered air into the room;
    a bypass damper system having at least one air filtering mode position and a bypass mode position; and
    a pressure control mechanism configured to automatically move the bypass damper system from the at least one air filtering mode position to the bypass mode position when the air received from the supply duct inlet exceeds a bypass pressure threshold;
    wherein the at least one air filtering mode position guides air from the supply duct inlet and air from the room air inlet to both pass through the filter and the outlet, and impedes air from passing from the supply duct inlet to the room air inlet; and
    wherein the bypass mode position guides air from the supply duct inlet into the room without passage through the filter and the outlet.

2. The air purification system of claim 1, further comprising:
    a pressure sensor configured to automatically measure air pressure received from the supply duct inlet; and
    wherein the pressure control mechanism is configured to automatically move the bypass damper from at least one air filtering mode position to a bypass mode position when the pressure sensor's measurement air exceeds a bypass pressure threshold.

3. The air purification system of claim 2, further comprising:
    wherein the pressure control mechanism includes an electronic controller configured to automatically activate movement of the bypass damper system from the at least one air filtering mode position to the bypass mode position when the pressure sensor's measurement air exceeds a bypass pressure threshold.

4. The air purification system of claim 3, configured to automatically move to bypass mode position when the air purification system is off.

5. The air purification system of claim 3, further comprising
    a fan having at least a high speed and a low speed; and
    wherein the electronic controller is configured to automatically activate the fan at high speed, while maintaining the bypass damper system in the at least one air filtering mode position when the air received from the supply duct inlet exceeds a minimum pressure threshold.

6. The air purification system of claim 1, wherein the pressure control mechanism is configured to automatically reset the bypass damper system by automatically moving from the bypass mode position to the at least one air filtering position when the bypass pressure threshold is no longer exceeded.

7. The air purification system of claim 1, wherein the bypass damper system includes a second air filtering mode position, wherein the second air filtering mode position guides air only from the supply duct inlet through the filter and the outlet.

8. The air purification system of claim 1, wherein the bypass mode position allows air to pass into the room through the room air inlet.

9. The air purification system of claim 8, wherein the a bypass damper system includes an air inlet damper comprising a two blade damper mechanism with a first blade and a second blade:
    the first blade defining one or more through holes; and
    the second blade configured to cover and uncover the one or more through holes in the first blade;
    wherein when the bypass damper is in the at least one air filtering mode position, the second blade covers the one or more through holes in the first blade; and
    wherein when the bypass damper is in the bypass mode position, the second blade uncovers the one or more through holes in the first blade.

10. The air purification system of claim 1, wherein the bypass mode position allows air to pass into the room through one or more bypass air outlets distinct from the room air inlet.

11. The air purification system of claim 10, wherein the a bypass damper system includes a bypass damper and an air inlet damper:

wherein in the bypass mode position:
   the bypass damper is positioned to expose the one or more bypass air outlets; and
   the air inlet damper is positioned to seal the room air; and
wherein in the at least one air filtering position;
   the bypass damper is positioned to seal the one or more bypass air outlets; and
   the air inlet damper is positioned to expose the room air inlet.

12. The air purification system of claim 1, further comprising:
   a first temperature sensor configured to automatically measure room air temperature and a second temperature sensor configured to measure supply duct air temperature.

13. The air purification system of claim 7, further comprising:
   a temperature sensor configured to automatically measure room air temperature; and
   wherein the bypass damper system is configured to be in the at least one air filtering mode position when a first temperature condition is met; and
   wherein the bypass damper system is configured to be in the second air filtering mode position when a second temperature condition is met.

14. The air purification system of claim 1, further comprising:
   a first ionizer configured to automatically emit charged particles into the air in a blend chamber located before the air filter and a second ionizer configured to emit charged particles into a supply duct chamber.

15. The air purification system of claim 1, further comprising:
   a check damper configured to automatically close and stop contaminants on the filter from passing into the room air when the bypass damper system is in bypass mode position.

16. The air purification system of claim 1, further comprising:
   one or more distribution panels configured to split air in two or more channels and provide distributed air across the filter when the bypass damper system is in the at least one air filtering mode position.

17. The air purification system of claim 16, further comprising:
   a substantially V-shaped load balancer configured to provide roughly equal amounts air to each of the two or more channels.

18. The air purification system of claim 1, further comprising:
   a first temperature sensor configured to automatically measure room air temperature;
   a second temperature sensor configured to automatically measure supply duct temperature; and
   an electronic controller configured to log room air temperatures from the first temperature sensor and log supply duct air temperatures from the second temperature sensor, the electronic controller further configured to determine and provide user alert messages based on the logged temperatures.

19. The air purification system of claim 18, where in the user alert messages include one or more of: an air filter changing recommendation, a temperature setting recommendation, a repair/service recommendation, a room door opening recommendation, and a refrigerant replacement/addition recommendation.

20. The air purification system of claim 18, wherein the second temperature sensor is located in the supply duct air inlet.

21. The air purification system of claim 1, further comprising:
   a first pressure sensor configured to automatically sense both supply duct pressure and ambient room air pressure;
   an electronic controller configured to log supply duct pressure and ambient room air pressure from the first pressure sensor, the electronic controller further configured to determine and provide user alert messages based on the logged pressures.

22. The air purification system of claim 21, wherein the electronic controller logs both room door open and room door closed ambient room air pressures from the first pressure sensor.

23. The air purification system of claim 21, wherein the electronic controller logs supply duct air pressure for a diagnostic period of time at one or more of the following conditions: without a filter installed, with a new filter installed; and with a used filter installed.

24. The air purification system of claim 22, wherein the first pressure sensor is configured to automatically establish open door and closed door initial pressure readings during installation; and wherein the electronic controller is configured to utilize the initial pressure readings to calculate an open door room pressure threshold and a closed door room pressure threshold.

25. The air purification system of claim 24, where in the electronic controller is utilizes the initial pressure readings in determining the user alert messages.

26. A method of providing pressurization relief comprising:
   providing an air purification system configured to fluidly receive air from a forced air system, to fluidly receive air from a room, and to expel filtered air into the room;
   measuring air pressures from the forced air system supply duct;
   measuring room air pressures;
   measuring room air temperatures;
   measuring air temperatures from the force air system supply duct;
   automatically releasing unfiltered air from the forced air system into the room when the air received from the forced air system exceeds a bypass pressure threshold;
   automatically expelling filtered air from both the room and the forced air system when the air received from the forced air system does not exceed a bypass pressure threshold and a first temperature condition is met; and
   automatically expelling filtered air from only the forced air system into the room when the air received from the forced air system does not exceed a bypass pressure threshold and a second temperature condition is met.

27. The method of claim 26, further comprising:
   automatically releasing unfiltered air from the forced air system into the room when the system is off or malfunctions.

28. The method of claim 26, further comprising:
   automatically activating a fan at high speed, when the air received from the supply duct inlet exceeds a minimum pressure threshold, lower than the bypass pressure threshold.

29. The method of claim 26, further comprising:
   automatically resetting to expelling filtered air when the bypass pressure threshold is no longer exceeded.

30. A method of providing usage alerts to a user of an air purification system comprising:
- installing an air purification system configured to fluidly receive air from a forced air system, to fluidly receive air from a room, and to expel filtered air into the room;
- measuring installation air pressures from the forced air system supply duct;
- measuring installation room air pressures;
- automatically determining a room profile including one or more room pressure thresholds utilizing the measured installation pressures; and
- measuring post installation room air pressures;
- measuring post installation air pressures from the forced air system supply duct; and
- providing an alert to the user when a room pressure and/or supply duct pressure threshold is reached.

31. The method of claim 30, wherein:
- the installation pressure reading(s) include one or more of: a pressure with a new filter, a pressure without filter, and a pressure with a used filter; and
- each respective type of installation pressure reading is utilized to calculate a respective room pressure and/or supply duct pressure threshold; and
- each respective room pressure and/or supply duct pressure threshold triggers a corresponding alert to the user when the room pressure and/or supply duct pressure threshold is reached.

32. The method of claim 31, wherein installation pressure reading(s) from the forced air system supply duct are measured for a diagnostic period of time.

33. The method of claim 31, wherein installation pressure readings without a filter, are utilized to calculate a first supply duct pressure threshold corresponding to a first alert that informs the consumer of the utility cost impact of a type of filter being used in the forced air system.

34. The method of claim 31, wherein installation pressure readings with a new filter, are utilized to calculate a second supply duct pressure threshold corresponding to a second alert that informs the user of the need to replace the forced air systems used air filter with a new one.

35. The method of claim 31, wherein installation pressure readings with a used filter, are utilized to calculate a third supply duct pressure threshold corresponding to a third alert that informs the user of a potential malfunction of the forced air system.

36. The method of claim 30, further comprising:
- measuring and logging room air temperatures;
- measuring and logging air temperatures from the forced air system supply duct; and
- providing user alert messages based on the logged temperatures.

37. The method of claim 36, wherein the user alert messages include one or more of: an air filter changing recommendation, a temperature setting recommendation, a repair/service recommendation, a room door opening recommendation, and a refrigerant replacement/addition recommendation.

38. The method of claim 30, comprising measuring both room door open and room door closed installation room air pressures.

39. The method of claim 38, wherein room open door and closed door installation pressures are utilized to determine an open door room pressure threshold and a closed door room pressure threshold.

* * * * *

UNITED STATES PATENT AND TRADEMARK OFFICE
CERTIFICATE OF CORRECTION

PATENT NO. : 9,254,459 B2  
APPLICATION NO. : 14/029650  
DATED : February 9, 2016  
INVENTOR(S) : Miller Page 1 of 1

It is certified that error appears in the above-identified patent and that said Letters Patent is hereby corrected as shown below:

In the claims,

Claim 9, column 26, line 48, please delete "wherein the a" and insert --wherein the--;

Claim 11, column 26, line 65, please delete "wherein the a" and insert --wherein the--;

Claim 25, column 28, line 31, please delete "controller is utilizes" and insert --controller utilizes--;

Claim 26, column 28, line 42, please delete "the force air" and insert --the forced air--.

Signed and Sealed this  
Third Day of May, 2016

Michelle K. Lee  
*Director of the United States Patent and Trademark Office*